United States Patent
Guzik et al.

(10) Patent No.: US 10,030,986 B2
(45) Date of Patent: Jul. 24, 2018

(54) INCIDENT RESPONSE ANALYTIC MAPS

(71) Applicants: WHP WORKFLOW SOLUTIONS, INC., North Charleston, SC (US); GETAC TECHNOLOGY CORPORATION, Taipei (TW)

(72) Inventors: Thomas Guzik, Edina, MN (US); Muhammad Adeel, Edina, MN (US)

(73) Assignees: WHP WORKFLOW SOLUTIONS, INC., North Charleston, SC (US); GETAC TECHNOLOGY CORPORATION (TW)

(*) Notice: Subject to any disclaimer, the term of this patent is extended or adjusted under 35 U.S.C. 154(b) by 0 days.

(21) Appl. No.: 15/197,697

(22) Filed: Jun. 29, 2016

(65) Prior Publication Data

US 2018/0003513 A1    Jan. 4, 2018

(51) Int. Cl.
*G01C 21/34* (2006.01)
*G06F 17/30* (2006.01)
*H04N 21/222* (2011.01)
*H04N 21/4143* (2011.01)
*H04N 21/4223* (2011.01)
(Continued)

(52) U.S. Cl.
CPC ... *G01C 21/3407* (2013.01); *G06F 17/30241* (2013.01); *H04N 21/222* (2013.01); *H04N 21/4143* (2013.01); *H04N 21/4223* (2013.01); *H04N 21/478* (2013.01); *H04N 21/84* (2013.01)

(58) Field of Classification Search
CPC ............. H04N 21/222; H04N 21/4143; H04N 21/4223; H04N 21/478; H04N 21/84; G01C 21/3407; G06F 17/30241
See application file for complete search history.

(56) References Cited

U.S. PATENT DOCUMENTS 4,908,719 A * 3/1990 Nonoyama ............ H04N 1/203
                                                         358/401
7,032,099 B1 * 4/2006 Imamura ................... G06F 9/52
                                                         712/29
(Continued)

OTHER PUBLICATIONS

International Search Report and Written Opinion dated Sep. 15, 2017, in PCT Application No. PCT/US2017/039925, 8 pages.

*Primary Examiner* — Khoi H Tran
*Assistant Examiner* — Robert T Nguyen
(74) *Attorney, Agent, or Firm* — Han Santos, PLLC

(57) ABSTRACT

Analytic maps may be used to develop and refine law enforcement strategies. Initially, the data assets and associated telemetry information of media recording devices may be stored in a primary database. The data assets include an audio recording, a video recording, or a multimedia recording. The associated telemetry information includes geolocations of the media recording devices at multiple times. References to the data assets and duplicate of the associated telemetry information are stored in a secondary database, in which the secondary database may provide faster data read speed than the primary database. Pre-calculations are performed based at least on the telemetry information as stored in the secondary database according to one or more mapping parameters to generate multiple sets of pre-calculated data. A set of pre-calculated data is then sent for presentation on an analytic map of a dashboard displayed on a remote computing device.

21 Claims, 12 Drawing Sheets

(51) Int. Cl.
*H04N 21/478* (2011.01)
*H04N 21/84* (2011.01)

(56) References Cited

U.S. PATENT DOCUMENTS

| | | | | |
|---|---|---|---|---|
| 7,864,764 | B1* | 1/2011 | Ma | H04L 12/413 370/389 |
| 8,495,296 | B2* | 7/2013 | Nagpal | G06F 17/30117 711/114 |
| 9,171,009 | B1* | 10/2015 | Faibish | G06F 17/30194 |
| 9,305,010 | B1* | 4/2016 | Faibish | G06F 17/30174 |
| 9,454,331 | B1* | 9/2016 | Bent | G06F 3/067 |
| 9,578,596 | B1* | 2/2017 | Rodoper | H04W 48/16 |
| 9,594,780 | B1* | 3/2017 | Esposito | G06F 17/303 |
| 9,626,377 | B1* | 4/2017 | Bent | G06F 17/30203 |
| 9,639,555 | B1* | 5/2017 | Faibish | G06F 17/30203 |
| 9,659,019 | B1* | 5/2017 | Bent | G06F 17/30091 |
| 9,665,308 | B2* | 5/2017 | Crawford | G06F 3/065 |
| 9,697,213 | B1* | 7/2017 | Faibish | G06F 17/30079 |
| 9,715,346 | B2* | 7/2017 | Jain | G06F 3/0619 |
| 9,720,779 | B2* | 8/2017 | Kuo | G06F 11/1451 |
| 9,916,311 | B1* | 3/2018 | Bent | G06F 17/30091 |
| 2003/0131714 | A1* | 7/2003 | Iguchi | G10H 7/02 84/604 |
| 2007/0136395 | A1* | 6/2007 | Fries | G06F 11/1464 |
| 2007/0210937 | A1 | 9/2007 | Smith et al. | |
| 2009/0106284 | A1* | 4/2009 | Kita | H04N 1/32122 |
| 2010/0030987 | A1* | 2/2010 | Na | G06F 3/0613 711/162 |
| 2010/0161933 | A1* | 6/2010 | Moon | G06F 12/0246 711/205 |
| 2012/0200411 | A1 | 8/2012 | Best | |
| 2012/0202446 | A1 | 8/2012 | Nichols et al. | |
| 2015/0039825 | A1* | 2/2015 | Anderson | G06F 3/0685 711/114 |
| 2015/0199128 | A1* | 7/2015 | Park | G06F 12/0246 711/103 |
| 2015/0324314 | A1* | 11/2015 | Morgan | G06F 13/4068 710/308 |
| 2016/0127307 | A1* | 5/2016 | Jain | G06F 3/0619 709/245 |
| 2016/0154704 | A1* | 6/2016 | Kuo | G06F 11/1451 707/646 |
| 2016/0266806 | A1* | 9/2016 | Crawford | G06F 3/065 |
| 2016/0328448 | A1* | 11/2016 | Kaijima | G06F 17/30492 |
| 2017/0109284 | A1* | 4/2017 | Ash | G06F 12/0815 |
| 2017/0366602 | A1* | 12/2017 | Kawazoe | H04L 67/10 |
| 2018/0025096 | A1* | 1/2018 | Iizawa | G06F 17/30997 |

* cited by examiner

INCIDENT RESPONSE ANALYTIC MAPS

BACKGROUND

A challenge in law enforcement is the efficient deployment of a limited number of law enforcement personnel to trouble spots. The deployment of additional law enforcement personnel to a particular location may result in a decline of criminal activity in that particular location. However, it is difficult to determine whether the drop in criminal activity is the result of an increasing number of community contacts and suspects being arrests, or the result of criminals and criminal activity moving to other locations. Further, it may also be difficult to determine effective policing strategies for different neighborhoods. For example, increasing proactive police patrols may be more effective in certain neighborhoods, while decreasing police response time to emergency calls may be more effective in other neighborhoods. Thus, the exact correlation between different policing tactics and reduction in criminal activity may be difficult to analyze and ascertain.

Furthermore, law enforcement agencies are increasingly equipping their law enforcement officers with media recording devices. Such law enforcement agencies may have policies mandating that their law enforcement officers use these media recording devices to record their interactions with the public. These recorded data assets may serve to protect the public from improper policing, as well as protect law enforcement officers from false allegation of police misconduct. However, due to the large volume of recordings that are captured, law enforcement agencies may have difficulty sorting and correlating the captured data assets with incidents.

SUMMARY

Described herein are techniques for using analytic maps to show relationships between the locations of incidents and the activities of law enforcement officers. The analytic maps may show the geographical distribution of incidents in a geographical area, such that areas with high rates of incidents may be highlighted. The analytic maps may also show the patrol routes and activities of particular patrol units. Additionally, the analytic maps may also show particular law enforcement officers that were in the vicinity of an incident or responded to an incident. Furthermore, the locations of incidents may be correlated with data assets that are captured by the media capture devices of the law enforcement officers. The data assets may include video files, audio files, and/or multimedia files. Accordingly, by selecting a particular incident or geographical location that is depicted on an analytic map, an investigator may access data assets that captured the particular incident at a geographical location.

In various embodiments, the generation of the analytic maps for a law enforcement agency may involve the periodic downloading of media capture device telemetry information and captured data assets into a primary database (e.g., relational or transactional database). Subsequently, the telemetry information and references to the data assets may be copied to a secondary database (e.g., non-relational or non-transactional database), where such raw data may be preemptively processed according to one or more mapping parameters to generate different sets of pre-calculated map data. For example, the mapping parameters may specify the calculations of map data for multiple map zoom levels, for multiple time and/or date intervals, for specific types of incidents, and/or so forth. In some embodiments, the telemetry information may be further combined with supplemental information from other databases prior to the generation of the pre-calculated map data. The supplemental information may include incident reports, police investigation reports, law enforcement officer station assignments, patrol vehicle assignments, arrest records, judicial records, and/or other relevant information.

In this way, each set of pre-calculated map data may be displayed in an analytic map on a dashboard. The dashboard may be generated by a web application and is accessible via a web browser or a client application. By providing user inputs to the analytic map, a user may view the depiction of specific incidents on the analytic map, as well as view incident data and data assets that are associated with the specific incidents.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
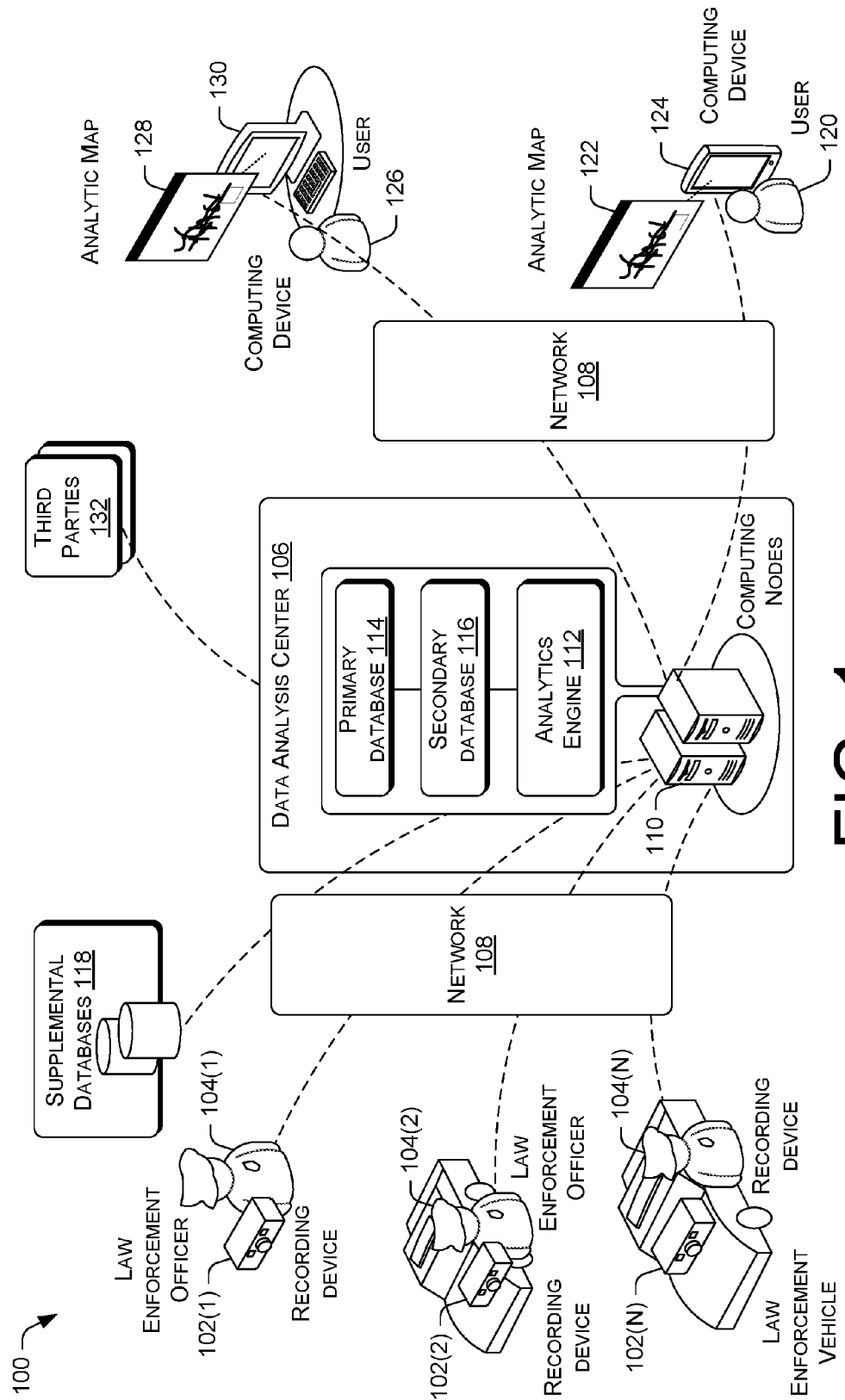
FIG. 1 illustrates an example architecture for generating analytic maps that show relationships between incidents and law enforcement activity.

This disclosure is directed to techniques for using analytic maps to show relationships between the locations of incidents and the activities of law enforcement officers. The analytic maps may show the geographical distribution of incidents in a geographical area, such that areas with high rates of incidents may be highlighted. The analytic maps may also show the patrol routes and activities of particular patrol units. Additionally, the analytic maps may also show particular law enforcement officers that were in the vicinity of an incident or responded to an incident. Furthermore, the locations of incidents may be correlated with data assets that are captured by the media capture devices of the law enforcement officers. The incidents may include any type of civil or criminal activities that are documented by a law enforcement agency, including activities that are reported to the law enforcement agency, responded to by officers of the law enforcement agency, investigated by the law enforcement agency, and/or otherwise associated with the law enforcement agency. The data assets may include video files, audio files, and/or multimedia files. Accordingly, by selecting a particular incident or geographical location that is depicted on an analytic map, an investigator may access data assets that captured the particular incident or activities at the geographical location at a particular time.

In various embodiments, the generation of the analytic maps for a law enforcement agency may involve the periodic download of media capture device telemetry information and captured data assets into a primary database. The primary database may be a relational or transactional database. The telemetry information for a media capture device may include an identifier of the device, as well as the geolocations of the device at regular time intervals. The telemetry information and references to the data assets may be sent to a secondary database, where such raw data may be preemptively processed according to one or more mapping parameters to generate different sets of pre-calculated map data. The secondary database may be a non-relational or non-transactional database. For example, the mapping parameters may specify that the calculations of map data be performed for multiple map zoom levels, for multiple time and/or date intervals, for specific types of incidents, and/or so forth. In some embodiments, the references and the telemetry information may be further combined with supplemental information from other databases prior to the generation of pre-calculated map data. The supplemental information may include incident reports, police investigation reports, law enforcement officer station assignments, patrol vehicle assignments, arrest records, judicial records, and/or other relevant information.

In this way, each set of pre-calculated map data may be displayed as an analytic map on a dashboard. The dashboard may be generated by a web application and is accessible via a web browser or a standalone application. By providing user inputs to the analytic map, a user may view incident data for specific incidents that are depicted on the analytic map, as well as view data assets that capture these specific incidents. The use of the secondary database in combination with the primary database for the purpose of generating analytic map data may provide several benefits. Initially, the primary database (e.g., a relational or transactional database) may be used to receive and store a large amount of data assets and telemetry information while guaranteeing the properties of atomicity, consistency, isolation, and durability (ACID) for the data. As such, the ability of the primary database to balance read and write performance makes the primary database suitable for handling large volumes of data. For example, the telemetry information for each data recording device may arrive at the primary database every 15 seconds, which may result in over 70 million to 80 million telemetry data records that are to be stored in the primary database for a typical law enforcement agency.

However, the use of the secondary database (e.g., a non-relational or non-transactional database) may ensure that the pre-calculation of map data for the analytic maps are performed in an expedient manner, as the secondary database is more adapt at supporting real-time big data calculations for web applications than the primary database (e.g., the relational or transactional database). For example, a non-transactional database may store data as associated data blobs rather than as relational data entries. In many instances, a non-transactional database that operates under the principle of eventual consistency may enable faster data access and data retrieval than a transactional database that uses a relational model to store data. In other words, the secondary database (e.g., the non-relational or non-transactional database) may provide faster data read speed than the primary database (e.g., the relational or transactional database). This is because the nature of the secondary database prioritizes read access over write access, while the primary database balances read and write performance.

The correlations between law enforcement activity and incidents as depicted analytic maps may be used by law enforcement agencies to develop strategies for responding to crime. By view analytic maps of different time periods, a law enforcement agency is able to visually ascertain the impact of law enforcement activities in different geographical areas over time. Thus, the law enforcement agency may adapt to changes and shifts in criminal activities as crime migrate to new areas due to socioeconomic or demographic changes. In this way, the law enforcement agency is able to reallocate law enforcement officers to different locations to maximize the use of policing resources while minimizing ineffective or wasteful policing practices. Example implementations are provided below with reference to the following figures.

Example Architecture

FIG. 1 illustrates an example architecture for generating analytic maps that show relationships between incidents and law enforcement activity. The architecture 100 may include media recording devices 102(1)-102(N). Each of the media recording devices 102(1)-102(N) may be a video recording device, an audio recording device, or a multimedia recording device that records both video and audio data. The media recording devices 102(1)-102(N) may include recording devices that are worn on the bodies of law enforcement officers, recording devices that are attached to the equipment, e.g., motor vehicles, personal transporters, bicycles, etc., used by the law enforcement officers. For example, a law enforcement officer 104(1) that is on foot patrol may be wearing the media recording device 102(1). In the same example, a law enforcement officer 104(1) that is on vehicle patrol may be wearing the media recording device 102(2). Further, a patrol vehicle of the law enforcement officer 104(N) may be equipped with the media recording device 102(N).

Each of the media recording devices 102(1)-102(N) may include on-board memory that stores the recordings, the audio recordings, or the multimedia recordings as data assets. Further, each media recording device may be equipped with communication capabilities for transmitting the data assets to a data analysis center 106. In some instances, the media recording device 102(1) may send data assets to the data analysis center 106 via a network 108. In other instances, the media recording device 102(2) may form an ad-hoc communication connection with a local computing device (e.g., on-board computer) in the patrol vehicle of the law enforcement officer 104(2). In turn, the local computing device may forward the data assets recorded by the media recording device 102(2) to the data analysis center 106 via the network 108.

In some embodiments, a media recording device may be equipped with telemetry software and hardware that provide the device with ability to generate telemetry data for periodic transmission to the data analysis center 106 via the network 108. The telemetry hardware may include a global positioning system (GPS) chip, an assisted GPS (A-GPS) chip, or other equivalent geo-positioning sensor. The telemetry data generated by the media recording device may include the identification information of the device, the periodic geolocation readings of the device, as well as the time and date stamp for each geolocation reading. For example, in some instances, a media recording device may be capable of taking a geolocation reading every 15 seconds. In other embodiments, a media recording device may be reliant upon another device to provide telemetry data to the data analysis center 106. For example, a computing device attached to the media recording device 102(2) may have geo-positioning capabilities. As such, the media recording device may rely on the attached computing device to provide the telemetry data to the data analysis center 106 via the network 108.

The data analysis center 106 may be a facility that is operated by a law enforcement agency, or a facility that is operated by a third-party that is offering services to the law enforcement agency. The data analysis center 106 may use computing nodes 110 to host an analytics engine 112. The network 108 may be a local area network ("LAN"), a larger network such as a wide area network ("WAN"), a carrier network, or a collection of networks, such as the Internet. Protocols for network communication, such as TCP/IP, may be used to implement the network 108. The network 108 may provide telecommunication and data communication in accordance with one or more technical standards. The computing nodes 110 may include general purpose computers, such as desktop computers, tablet computers, laptop computers, servers, or other electronic devices that are capable of receive inputs, process the inputs, and generate output data. In other embodiments, the computing nodes 110 may be virtual computing devices in the form of virtual machines or software containers that are hosted in a cloud.

The analytics engine 112 may periodically receive data assets from the media recording devices 102(1)-102(N). Additionally, the analytics engine 112 may also receive telemetry information directly from each media recording device or an associated computing device. In various embodiments, the analytics engine 112 may obtain the data assets and the telemetry information by via data push or data pull. In data push, each device may actively send the data assets and the telemetry information to the analytics engine 112 on a periodic basis. In data pull, the analytics engine 112 may actively poll each media recording device for the data assets and the telemetry information on a recurring basis.

The analytics engine 112 may store the data assets and the associated telemetry information in a primary database 114. The primary database 114 may be a relational or transactional database. Accordingly, as new data assets and telemetry information arrive at the data analysis center 106, the analytics engine 112 may create new database entries in the primary database 114. Further, the analytics engine 112 may generate a reference to the data asset that is stored in the primary database 114. The analytics engine 112 may send a reference for each data asset and the associated telemetry information to the secondary database 116. The secondary database may be a non-relational or non-transactional database. In various embodiments, the secondary database 116 (e.g., the non-relational or non-transactional database) may provide faster data read speed than the primary database 114 (e.g., the relational or transactional database).

Once the references and the associated telemetry information are stored in the secondary database 116, the analytics engine 112 may use such raw data to pre-calculate map data for the analytic maps. In various embodiments, the map data may be pre-calculated according to one or more mapping parameters to generate different sets of pre-calculated map data. For example, the mapping parameters may specify that the calculations of map data be performed for multiple map zoom levels, for multiple time and/or date intervals, for specific types of incidents, and/or so forth. In some embodiments, the reference information and the telemetry information may be further combined with supplemental information from the supplemental databases 118 prior to the performance of the pre-calculations. The supplemental information may include incident reports, police investigation reports, law enforcement officer station assignments, patrol vehicle assignments, arrest records, judicial records, and/or other relevant information. The supplemental databases 118 may include databases that are maintained by the data analysis center 106 and/or databases that are maintained by third parties. Such third parties may include governmental agencies, private enterprises, law enforcement agencies, and/or so forth.

In various embodiments, the sets of pre-calculated map data may be displayed in analytic maps on a dashboard. The dashboard may be generated by a web application and is accessible via a web browser. Alternatively, the dashboard may be accessed a standalone client application on a user device. For example, a user 120 may view an analytic map 122 using a web browser or client application that is executing on a computing device 124. Likewise, a user 126 may view an analytic map 128 using a standalone application that is executing on the computing device 130. The analytic maps may show the geographical distribution of incidents in a geographical area, such that areas with high rates of incidents may be highlighted. The analytic maps may also show the patrol routes and activities of particular law enforcement units. Additionally, the analytic maps may also show particular law enforcement officers that were in the vicinity of an incident or responded to an incident. Furthermore, the locations of incidents may be correlated with data assets that are captured by the media recording devices 102(1)-102(N) of the law enforcement officers 104(1)-104(N). Accordingly, by selecting a particular incident or geographical location that is depicted on an analytic map, a user may access data assets that captured the particular incident or activities at the geographical location at a particular time. In some embodiments, the data analysis center 106 may export the data that are received, processed, and/or generated by the analytics engine 112 to one or more third parties 132, such that the data may be stored and/or processed by the third parties 132. The third parties 132 may include governmental agencies, private entities, law enforcement agencies, and/or so forth.

Example Server Components

Figure 2:
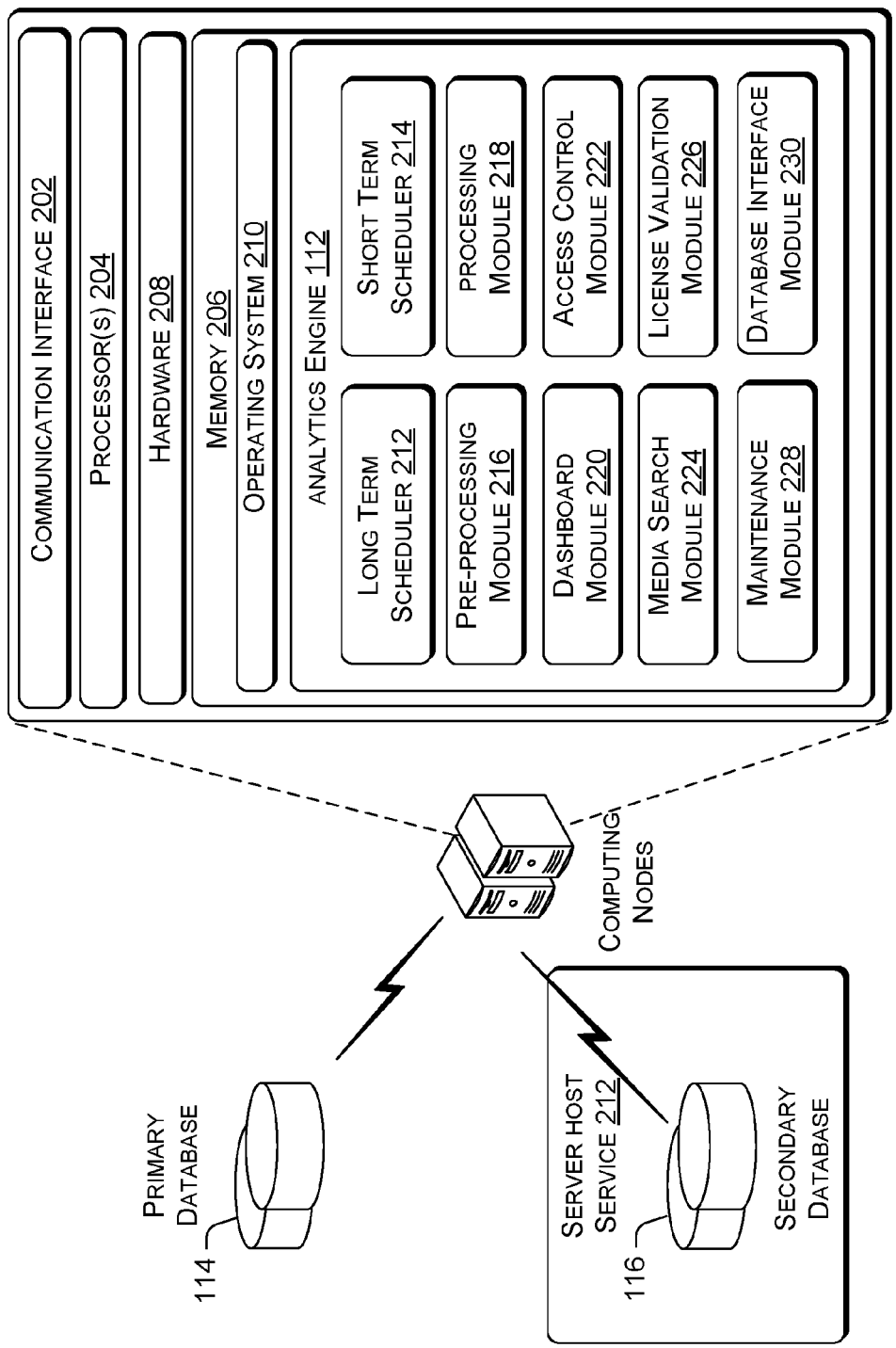
FIG. 2 is a block diagram showing various software and hardware components for generating analytic maps that show relationships between incidents and law enforcement activity.

FIG. 2 is a block diagram showing various software and hardware components for generating analytic maps that show relationships between incidents and law enforcement activity. The hardware components may include one or more processors 204, memory 206, and/or user controls that enable a user to interact with the software components. The memory 206 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism.

The computing nodes 110 may have network capabilities. For example, the computing nodes 110 may exchange data with other electronic devices (e.g., laptops, computers, other servers, etc.) via one or more networks, such as the Internet. Communications between the computing nodes 110 and the other electronic devices may utilize any sort of communication protocol for sending and receiving messages, such as TCP/IP and/or HTTP.

The one or more processors 204 and the memory 206 of the computing nodes 110 may implement an operating system 208. The operating system 208 may include components that enable the computing nodes 110 to receive and transmit data via various inputs (e.g., user controls, network interfaces, and/or memory devices), as well as process data using the one or more processors 204 to generate output. The operating system 208 may include a presentation component that presents the output (e.g., display the data on an electronic display, store the data in memory, transmit the data to another electronic device, etc.). Additionally, the operating system 208 may include other components that perform various additional functions generally associated with an operating system. The one or more processors 204 and the memory 206 of the computing nodes 110 may also implement the analytics engine 112. The analytics engine 112 may include a long term scheduler 212, a short term scheduler 214, a pre-processing module 216, a processing module 218, a dashboard module 220, an access control module 222, a media search module 224, a license validation module 226, a maintenance module 228, and a database interface module 230. The modules may include routines, program instructions, objects, and/or data structures that perform particular tasks or implement particular abstract data types.

Each of the long term scheduler 212 and the short term scheduler 214 may cause one or more modules of the analytics engine 112 to periodically perform tasks. However, the long term scheduler 212 may be used to schedule tasks that take longer to perform than those tasks that are scheduled by the short term scheduler 214. For example, the long term scheduler 212 may schedule the pre-processing module 216 to routinely obtain data assets and associated telemetry information from the media recording devices 102(1)-102(N). On the other hand, the short term schedule 214 may schedule the processing module 218 to perform pre-calculations using at least the telemetry information. In various embodiments, each of the schedulers may generate a job log of the tasks that are handled by the scheduler for the purpose of task tracking and error troubleshooting.

The pre-processing module 216 may receive data assets and telemetry information of media recording devices 102(1)-102(N) and store such information into the primary database 114. In various embodiments, the pre-processing module 216 may periodically pull the data from each device by sending a request for the telemetry information or the data asset. In turn, the pre-processing module 216 may store each received data asset and its corresponding telemetry information as associated data in the primary database 114. Each data asset may include metadata that documents the time and date at which the asset was recorded, the duration of the asset, the device identifier of the device that recorded the data asset, the geolocation at which the asset is recorded, and/or so forth. Accordingly, the pre-processing module 216 may use the metadata of a data assets to associate the data asset with corresponding device telemetry information.

In at least one embodiment, the pre-processing module 216 may receive a newly arriving data asset and associated telemetry information and may create a master record, storing a primary key for the record along with metadata specific to the master record such as a date/time stamp, identifier for the uploading officer, and potentially a foreign key to a case identifier of a case management system. The pre-processing module 216 may then create a data asset record to store either the data asset as a binary, or a file location of the data asset, along with a primary key of the master record as a foreign key. The pre-processing module 216 may additionally create a supplementary data record to store the associated telemetry information, along with a primary key of the master record as a foreign key, and along with metadata specific to the data asset. The creation of these three separate records may be controlled by a transaction monitor of the pre-processing module 216 to ensure that all three records are created, rather than creating an orphaned record. Separating storage of the data asset, provides the advantage of minimizing data asset retrieval, and provides for separately indexing data assets, for example with a clustered index, to optimize retrieval.

The pre-processing module 216 may perform other tasks with respect to the data assets. The tasks may include generating a reference to each data asset. The reference to a data asset may be a data identifier that enable the data asset and/or any data associated with the data asset to be retrieved from the primary database 114.

The tasks may additionally include the extraction of thumbnail images and text information from a data asset. A thumbnail image may be extracted from a video or multimedia data asset for the purpose of representing the data asset in an interactive interface. The text information may be extracted from the metadata of data asset. For example, a file name of a data asset may indicate that the data asset is captured near a certain street address. Accordingly, the pre-processing module 216 may store the text of the file name as associated data for the data asset. In other instances, the pre-processing module 216 may employ a speech-to-text engine to extract text information from an audio data asset or a multimedia data asset for storage as associated information for the data asset in the primary database 114. The speech-to-text engine may be trained using various approaches, such as supervised learning, unsupervised learning, semi-supervised learning, naïve Bayes, Bayesian networks, decision trees, neural networks, fuzzy logic models, and/or probabilistic classification models.

The tasks may also include the assembly of received data asset file chunks into a single file. In some scenarios, a capture data asset may have been broken down into multiple data file chunks by a media recording device for uploading to the data analysis center 106. In such scenarios, the pre-processing module 216 may use a file assembler to assembler the data file chunks into a data assets. The use of the file assembler may enable the data analysis center 106 to receive data assets of any arbitrary size.

The tasks may further include the transcoding of data assets prior to storage into the primary database 114. For example, the transcoding of a data asset may involve converting a file format of the data asset to generate a copy of the data asset that is in another file format. In some instances, the pre-processing module 216 may also perform redaction for a data asset. The redaction may involve the filtering out certain audio snippets or video images. For example, a name of a specific person may be bleeped out of a data asset or the face of the specific person as captured in a video asset may be blurred or pixelated to protect the identity of the person. In such instances, the pre-processing module 216 may use an audio or facial recognition software to detect the audio snippet and/or facial images in a data asset for modification. In this way, the pre-processing module 216 may generate a redacted version of a data asset. In various embodiments, the pre-processing module 216 may preserve an original version of a data asset in additional to one or more modified versions of the data asset. The original and modified versions of the data asset may be stored as associated data files. The preservation of the original versions of the data assets may maintain the chain of custody or safeguard the evidentiary value of the data assets in judicial proceedings. Accordingly, in one scenario, the data stored in the primary database 114 for a data asset may include the data asset, the reference for the data asset, the associated telemetry information, the associated text information, and/or one or more modified versions of the data asset.

Upon a prompt from the long term scheduler 212, the pre-processing module 216 may copy the reference for each data asset and the associated telemetry information to the secondary database 116 for storage as raw data. The pre-processing module 216 may repeat the acquisition and storage of the data assets and the associated telemetry data, as well as the copying of such data to the secondary database 116, in accordance to a schedule dictated by the long term scheduler 212. For example, the acquisition and storage of the telemetry data of the media recording devices 102(1)-102(N) may occur every 15 seconds. However, the pre-processing module 216 may query the media recording devices 102(1)-102(N) for newly recorded data assets at five minute intervals. Further, the copying of the references and the telemetry information to the secondary database 116 may be scheduled to occur every ten minutes.

The processing module 218 may pre-calculate map data for the analytic maps based on the raw data stored in the secondary database 116. In various embodiments, the secondary database 116 may be hosted by a server host service 232. For example, the secondary database 116 may be hosted on a virtual private server (VPS) or another type of virtual machine. In such embodiments, the short term scheduler 214 may call the processing module 218 to access the raw data and initiate the pre-calculations. The analytic maps may be displayed via a dashboard that is generated by the processing module 218, in which the dashboard is accessible via a web browser or a client application on a remote computing device, such as the computing device 124. In various embodiments, the map data may be pre-calculated according to one or more mapping parameters to generate different sets of pre-calculated map data. The mapping parameters may specify that the calculations of map data be performed for multiple map zoom levels, for multiple time and/or date intervals, and/or so forth. For example, a set of map data may be pre-calculated for a zoom level that corresponds to a 1/10 of a mile resolution, in which the map data is for displaying incidents that occurred in the month of February. In another example, another set of map data may be pre-calculated for a zoom level that corresponds to a quarter mile resolution, in which the map data is for displaying incidents that occurred in the month of March. The processing module 218 may store the pre-calculated map data in the secondary database 116.

In some embodiments, the processing module 218 may obtain supplemental information from the supplemental databases 118. The supplemental information may include incident reports, police investigation reports, law enforcement officer station assignments, patrol vehicle assignments, arrest records, judicial records, and/or other relevant information. The processing module 218 may correlate the supplemental information with the data assets and/or telemetry information based on identification keys. The identification keys may include incident identifiers, case identifiers, personnel identification information, suspect identification information, time and date stamps, and/or so forth. The supplemental information may enable the processing module 218 to pre-calculate richer or more selective sets of map data. For example, a set of map data may be pre-calculated for a zoom level that corresponds to a 1/10 of a mile resolution, in which the map data is for displaying misdemeanor incidents for the month of February. In another example, another set of map data may be pre-calculated for a zoom level that corresponds to a quarter mile resolution, in which the map data is for displaying incidents in which a particular law enforcement officer made arrests in the month of March.

The processing module 218 may perform the pre-calculations based on the regular prompts from the short term scheduler 214. In some embodiments, the sets of map data that are pre-calculated may be tailored based on an individual identity or a group identity of a user. For example, the processing module 218 may track the sets of map data that are most frequently accessed by a particular user in order to pre-calculate one or more sets of map data upon a login of the particular user to the analytics engine 112.

In some embodiments, the processing module 218 may filter out some of the raw data prior to performing the pre-calculation of the map data. For example, the telemetry information for a media recording device may include the geolocations of the device at 15-second intervals over a period time. However, it may be impractical to plot the geolocations of the device on an analytic map on such a frequent basis due to the amount of computing resources demanded. Accordingly, the processing module 218 may filter out most of the geolocation data for calculation such that the geolocations of the media recording device may be plotted on an hourly basis.

The processing module 218 may also generate additional map data for display as analytic maps based on user input. These additional map data may be generated from the raw data that is stored in the secondary database 116. In various embodiments, the analytic maps that are displayed to a user may contain interactive controls, in which such controls can be used to modify the display of existing map data or request additional data. For example, a user may request the display of the identification information one or more specific law enforcement officers that responded to a particular set of incidents, the display of current geolocations of a law enforcement officers that are based at a particular police station, the display of response time, investigation time, or patrol time of different law enforcement officers, and/or so forth. The interactive controls of the analytic maps may further enable a user to request the playback of a data asset that is associated with a specific incident, the display of police or investigation information for the specific incident, and/or so forth. For the purpose of playing back a data asset, the processing module 218 may retrieve the data asset from the primary database 114. For the purpose of displaying the police or investigation information, the processing module 218 my retrieve the information from the secondary database 116 or the supplemental databases 118. The functions of the processing module 218 in generating map data and other data for display, as well as responding to requests for additional data, are further illustrated by the interactive interface shown in FIGS. 3-8.

The dashboard module 220 may generate a dashboard that enables users to access the analytic maps, as well as other data that are stored in the primary database 114, secondary database 116, and/or the supplemental database 118. The dashboard may be remotely accessed via a web browser or a client application that resides on a remote computing device of a user, such as the computing device 130. The dashboard may present various interactive interfaces for users to input data requests, such that the dashboard may respond with the request data. Accordingly, the dashboard may receive user requests or queries for analytic maps or other data to display, and use the processing module 218 to retrieve or generate the data. The dashboard module 220 may use different protocols to transmit dashboard data for display by a web browser or a client application. The protocols may include the common gateway interface (CGI) protocol, the active server pages (ASP) protocol, asynchronous JavaScript and XML (AJAX), hypertext transfer protocol secure (HTTPS) protocol, and/or the like.

In some embodiments, the web browsers or the client applications on the remote computing devices of the users may access the dashboard via a web proxy service. The remote computing devices and the computing nodes 110 generally do not share the same network or the same network domain. Accordingly, the web proxy service may serve as an intermediary to route data requests and the output data between the remote computing devices and the computing nodes 110. For example, the web proxy service may be implemented using Active Directory, HAProxy, NGINX, or another type of web proxy service. In some embodiments, a remote computing device that desires to access a dashboard may have a proxy client application installed to take advantage of the web proxy service.

The access control module 222 may control the ability of users to access the data that are generated by the processing module 218. In various embodiments, each authorized user may establish a corresponding account by providing registration information to the access control module 222 via a web registration interface. The ability of each authorized user to establish an account may be contingent upon the user being able to provide an authorization code to the access control module 222. The authorization code may generated in advance by the access control module 222 and distributed to an agency that is using the services provided by the data analysis center 106. The registration information may include a user name, agency affiliation information, user group information, user role information, user contact information, user password, and/or so forth. Accordingly, the access control module 222 may established an access account for the user based on the registration information.

The ability of the each user to access data stored by the analytic engine 112 may be dictated by access control policies. In some embodiments, an access control policy may dictate the nature and amount of data as stored in the secondary database 116 that are to be displayed to a particular user via the analytic maps. In other embodiments, each of the data assets stored in the primary database 114 may have its own access control list that dictates the specific users that are able to access the data asset. The access privilege of a user as stored in the access control list of a data asset may be updated based on a group affiliation of the user, a relationship of the user to another user, a relationship of the user to a specific incident or case, and/or so forth.

In a scenario in which there are large number of users, global updates to the access privileges of users stored in the access control lists of many data assets across groups or relationship types may cause a slowdown of the primary database 114. Such a slowdown of the primary database 114 may cause sluggish and unpredictable response to data requests by the primary database 114. In order to counter this problem, the access control module 222 may implement a strategy of asynchronous access control list update. In asynchronous updating, the access control module 222 may parse the individual access privilege modifications for a user from a global access privilege update for multiple data assets. The access control module 222 may store the individual access privilege modification for the user in a temporary data buffer, along with a pending modification flag value indicating that the access privileges of the user has changed. Accordingly, when a user logs in using a user account, the access control module 222 may check whether a pending modification flag value for the user is present in the data buffer. Thus, if the pending modification flag value is present in the data buffer, the access control module 222 may implement the individual access privilege modifications for the user across the access control lists of the multiple assets. The access privilege modification to an access control list of a data asset may grant the user access to the data asset, revoke the access of the user to the data asset, grant conditional access to the data asset, and/or so forth. For example, the conditional access may enable the user to access the data assets following the entry of an access code that the user requests from a supervisor.

The media search module 224 may enable an authorized user to search for data assets using words or terms. The words or terms may include descriptors that are tied to the data assets or mined from the data assets by a speech-to-text engine. The words or terms may be media file names, recording dates, recording times, incident descriptors, individual names, location names, or other relevant information. In return, the media search module 224 may provide links and descriptions (e.g., thumbnail image, descriptive words, etc.) of data assets for display via a dashboard. The link for a data asset may be a tied to a reference of the data asset, such that the user may access the primary database 114 to retrieve the data asset for playback.

The license validation module 226 may validate the digital signature of a client application that is used by a user to access the maps and data generated by the analytic engine 112. The client application may be installed on a remote computing device, such as the remote computing device 130. Each client application distributed by the operator of the data analysis center 106 may be equipped with a unique license key. Accordingly, the license validation module 226 may check the license key of each client application against an authorization database to ensure that the client application is authorized to access the data generate by the analytics engine 112. If the license validation module 226 determines that the client application is not authorized, the license validation module 226 may cause the client application to suspend operation. In other embodiments, the license validation module 226 may also collect and analyze client application usage statistics, i.e., application usage logs, track client application versions that are in use, track the number of client application copies that are in use, and/or so forth.

The maintenance module 228 may perform various routine tasks to ensure the continuous operations of the analytic engine 112. In some embodiments, the maintenance module 228 may periodically calculate the amount storage space used in the primary database 114 and the amount of storage space taken up by the data blobs in the secondary database 116. Subsequently, the maintenance module 228 may cross correlate the two storage space amounts to ensure that no data has been accidentally deleted from one of the databases due to a system bug or error. In other embodiments, the maintenance module 228 may periodically purge job logs that are created by the long term scheduler 212 and the short term scheduler 214 for tasks performed by the modules of the analytic engine 112.

The database interface module 230 may enable the analytic engine 112 to obtain data from multiple databases, such as the supplemental databases 118 that are maintained by the data analysis center 106 and/or third-parties. Accordingly, the database interface module 230 may call application program interfaces (APIs) or invoke database adapters of the multiple databases to import data for analysis in conjunction with the data that are received from the recording devices 102(1)-102(N). In additional embodiments, the database interface module 230 may also provide APIs or database adapters that are used by third-parties to access and retrieve data that are obtained and/or processed by the analytics engine 112. Such data may include the data that are stored in primary database 114 and the secondary database 116, and/or data that are generated by the analytic engine 112. For example, the data may include data assets, telemetry information, pre-calculated data, incident data, and/or so forth. In this way, a third-party may obtain the data from the analytic engine 112 for further storage, processing, and/or retrieval.

Example Analytic Maps

FIGS. 3-8 depict illustration dashboard interfaces 300-800 for displaying analytic maps that are generated by the analytics engine 112 of the data analysis center 105. The dashboard interface may be presented by a dashboard that is displayed on a remote computing device of a user. The remote computing device may connect to the analytic engine 112 via the network 108.

Figure 3:
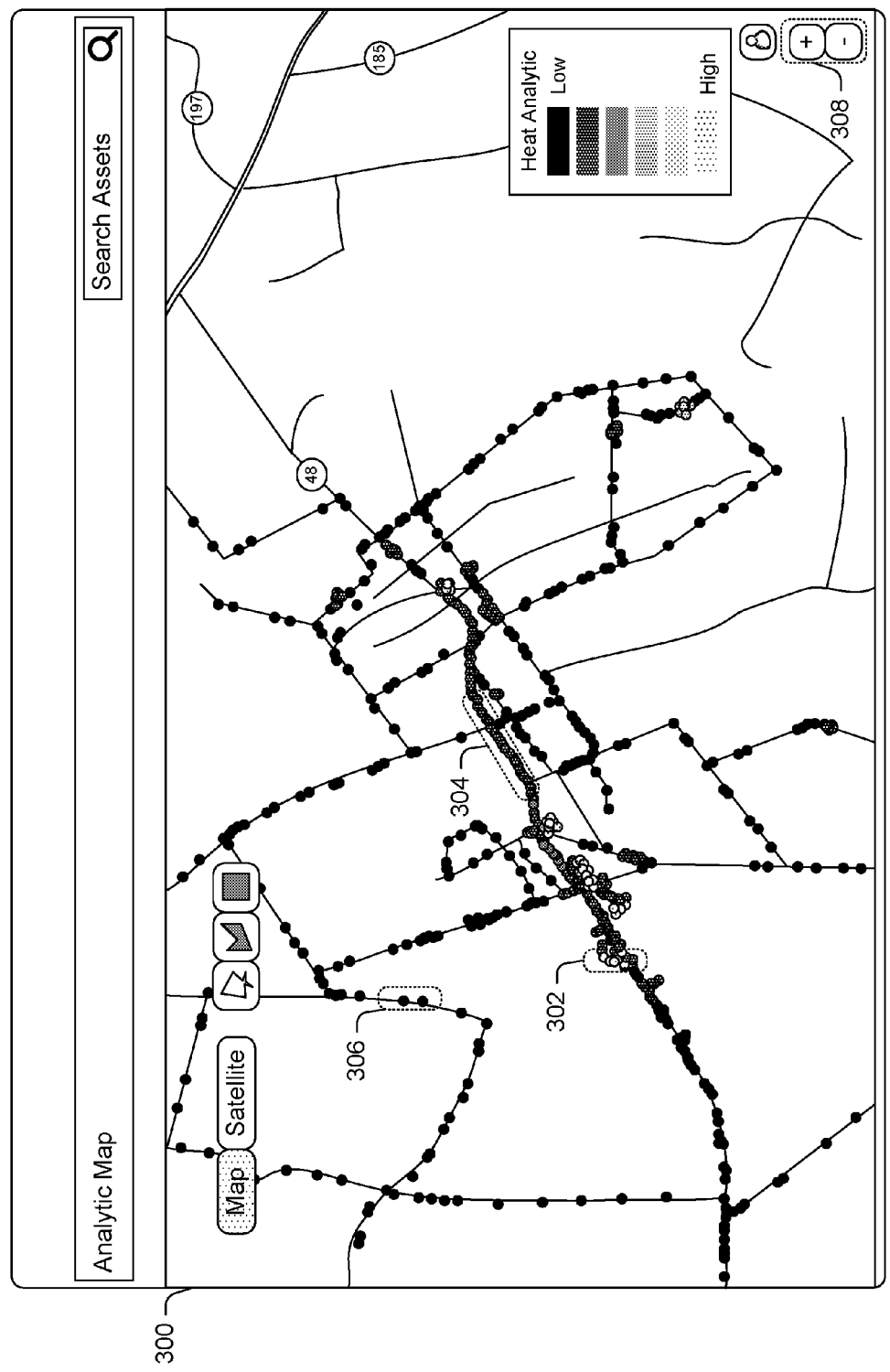
FIG. 3 is an illustrative dashboard interface for displaying analytic map data that depicts the distribution of incidents in a geographical area.

FIG. 3 is an illustrative dashboard interface 300 for displaying analytic map data that depicts the distribution of incidents in a geographical area. The dashboard interface 300 may show the distribution of incidents in a geographical area over a particular time period, in which the incidents have been responded to or otherwise receive contact from law enforcement officers of a law enforcement agency. Each marker (e.g., circle) shown in the dashboard interface 300 may represent a specific incident. The incident markers may be depicted using different colors, shadings, or other graphical variations to show the saturation degrees of different incidents. For example, the incident markers in region 302 may be graphically depicted as being in a high incident area. In another example, the incident markers in region 304 may show that the corresponding areas is a medium incident area. In an additional example, the incident markers in region 306 may show that the corresponding area is a low incident area. The dashboard interface 300 may be equipped with zoom controls 308 that enables the user to view the incident distribution at multiple zoom levels.

The incident data presented in the dashboard interface 300 may enable a law enforcement agency to determine the distribution of incidents in a geographical area. Accordingly, the law enforcement agency may reallocate policing resources to those regions with the highest concentration of incidents. The reallocation of policing resources may result in the redistribution of incidents to other regions of the geographical area that is visible through analytic maps that are similar to the one displayed in the dashboard interface 300. Thus, the dashboard interface 300 may serve as a tool that assists the law enforcement agency in continuously refining the patrol routes and allocation of law enforcement man power to achieve maximum efficiency. In some embodiments, dashboard interface 300 may be reconfigured such that the graphical variation of the incident markers represent different incident types rather than incident distribution. The display of such map data by the dashboard interface 300 may enable a law enforcement agency to target law enforcement effort against specific incident types.

Figure 4:
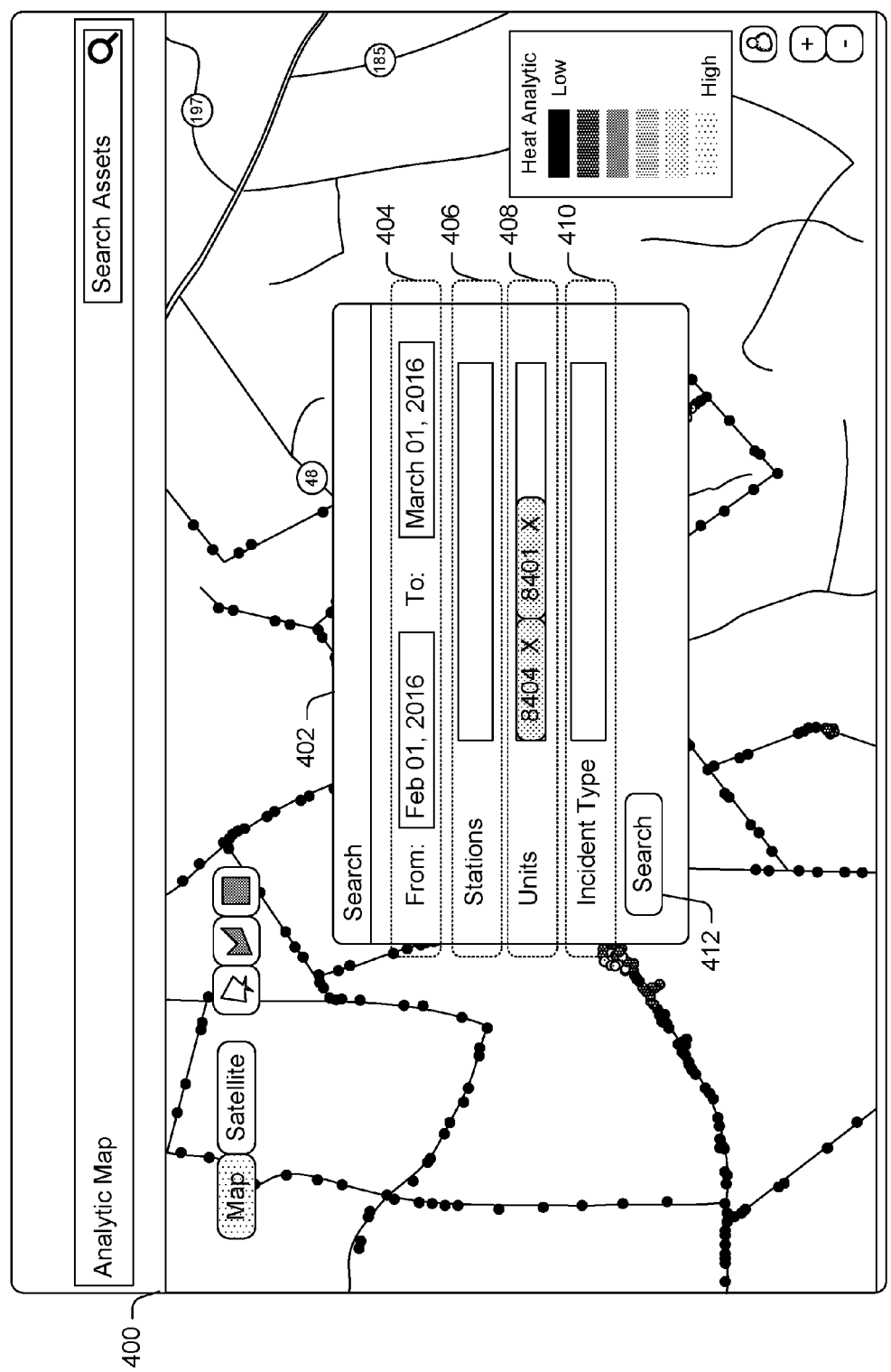
FIG. 4 is an illustrative dashboard interface that is used to query for incident information collected by a law enforcement agency according to different query parameters.

FIG. 4 is an illustrative dashboard interface 400 that is used to query for incident information collected by a law enforcement agency according to different query parameters. The dashboard interface 400 may display a search control window 402 that is instantiated following the activation of a search function by the user. The search control window 402 may enable the user to search for incidents that meet one or more criteria. Accordingly, the search control window 402 may include a date range control 404 that enables the user specify a particular range for conducting a search. The station control 406 may enable the user to specify that the search is for incidents which are responded to by law enforcement officers that are assigned to one or more specific police stations. On the other hand, the unit control 408 may enable the user to specify that the search is for incidents which are responded to by specific law enforcement units. For example, a law enforcement unit may be a law enforcement officer or a team of law enforcement officers that are working together.

The incident type control 410 may enable the user to specify incidents of one or more specific types to include in the search. For example, the incident type may be based on the nature of the offense in an incident (e.g., assault, theft, robbery, etc.), the action taken by a police officer in an incident (e.g., arrest, traffic stop, citizen contact, etc.), the nature of the charge resulting from the incident (civil offense, misdemeanor, felony, etc.), and/or so forth. Once the user has specified the one or more criteria, the user may activate the search control 412 to command the analytics engine 112 to search for incidents that match the criteria. Subsequently, the dashboard interface 400 may display matching incidents for viewing by the user. In this way, the user may analyze trends and patterns in incident response by particular law enforcement officers.

Figure 5:
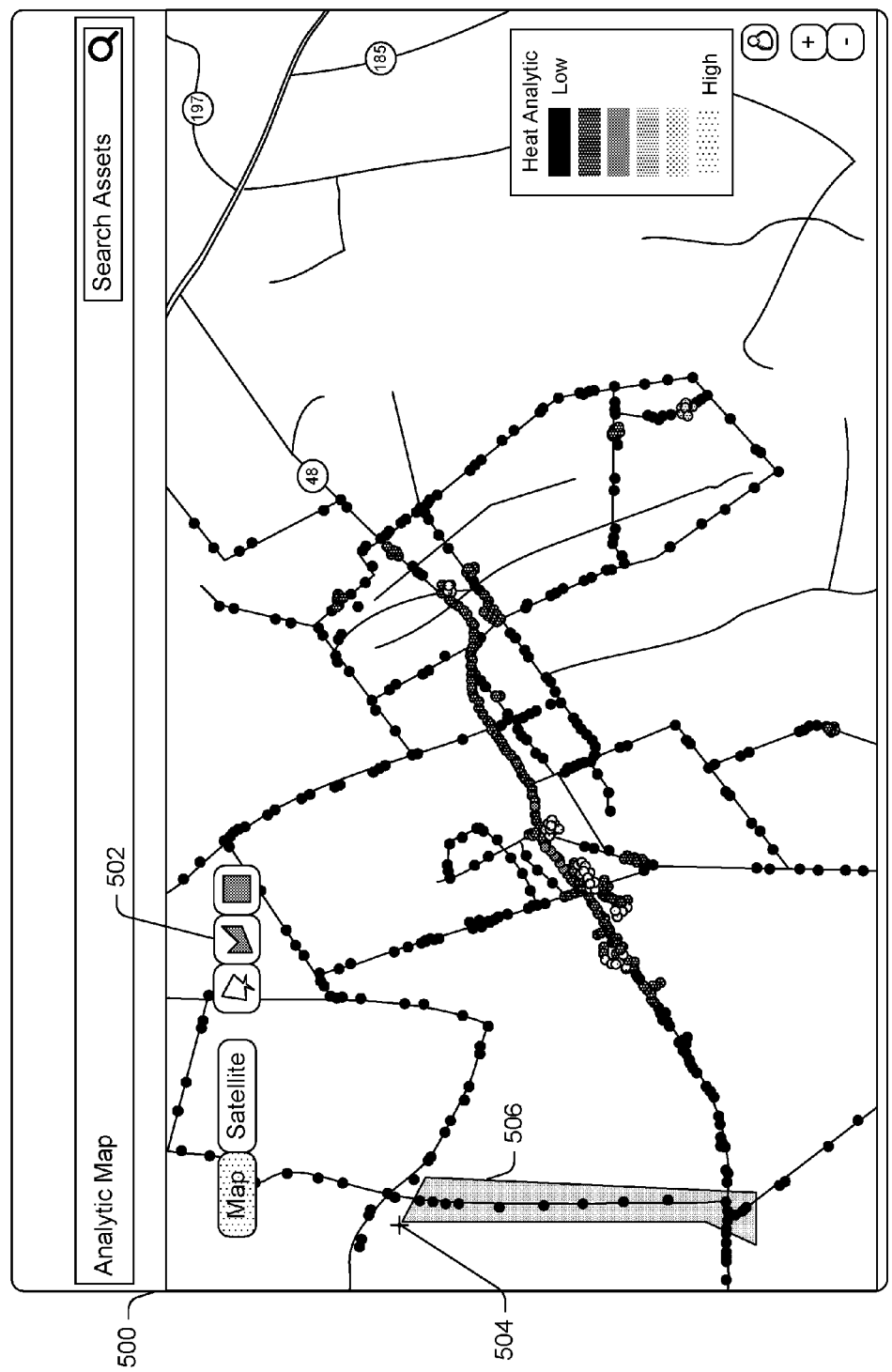
FIG. 5 is an illustrative dashboard interface that is used to query for law enforcement activity information that relate to a specific set of incidents that occurred in a particular geographical area.

FIG. 5 is an illustrative dashboard interface 500 that is used to query for law enforcement activity information that relate to a specific set of incidents that occurred in a particular geographical area. The dashboard interface 500 may providing a geo-fencing control 502. Further, incident markers for incidents that occurred during a particular time interval at a geographical area may be displayed by the dashboard interface 500. The activation of the geo-fencing control 502 may enable the user to use a pointer 504 to select a particular group of incident markers by drawing an enclosed shape 506 (e.g., a polygon) around a specific set of incident markers. Following the selection of the incident markers, the analytics engine 112 may display information on one or more law enforcement units that responded to the incidents that are selected as depicted in FIG. 6.

Figure 6:
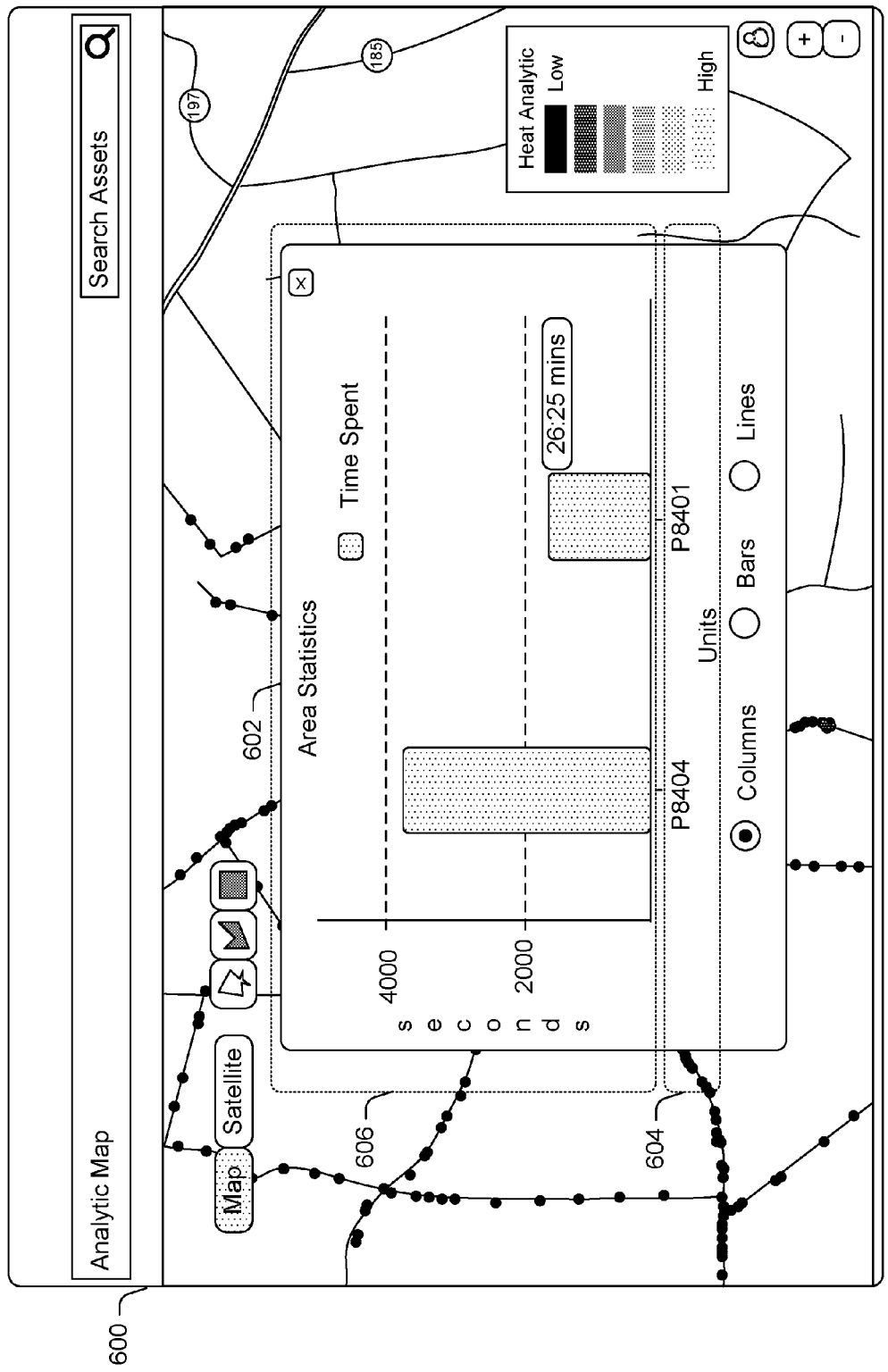
FIG. 6 is an illustrative dashboard interface that displays law enforcement activity information for a specific set of incidents that occurred in a geographical area.

FIG. 6 is an illustrative dashboard interface 600 that displays law enforcement activity information for a specific set of incidents that occurred in a geographical area. As described above, the user may have selected a specific set of incident via the geo-fencing control 502. In turn, the dashboard interface 600 may display an information window 602. The information window 602 may include a section 604 that shows the identity of the law enforcement units that responded to the selected incidents. For example, as shown in the information window 602, the law enforcement units may include "P8404" and "P8401." The information window 602 may also provide additional information regarding the law enforcement response. As shown in the information window 602, such information may be displayed in a section 606 that shows the amount of time each law enforcement unit spent respond to the incidents. However, in other embodiments, such information may further include text descriptions of the incidents, links to data assets capturing such incidents, links to associated incident reports, arrest records, court documents, and/or so forth.

Figure 7:
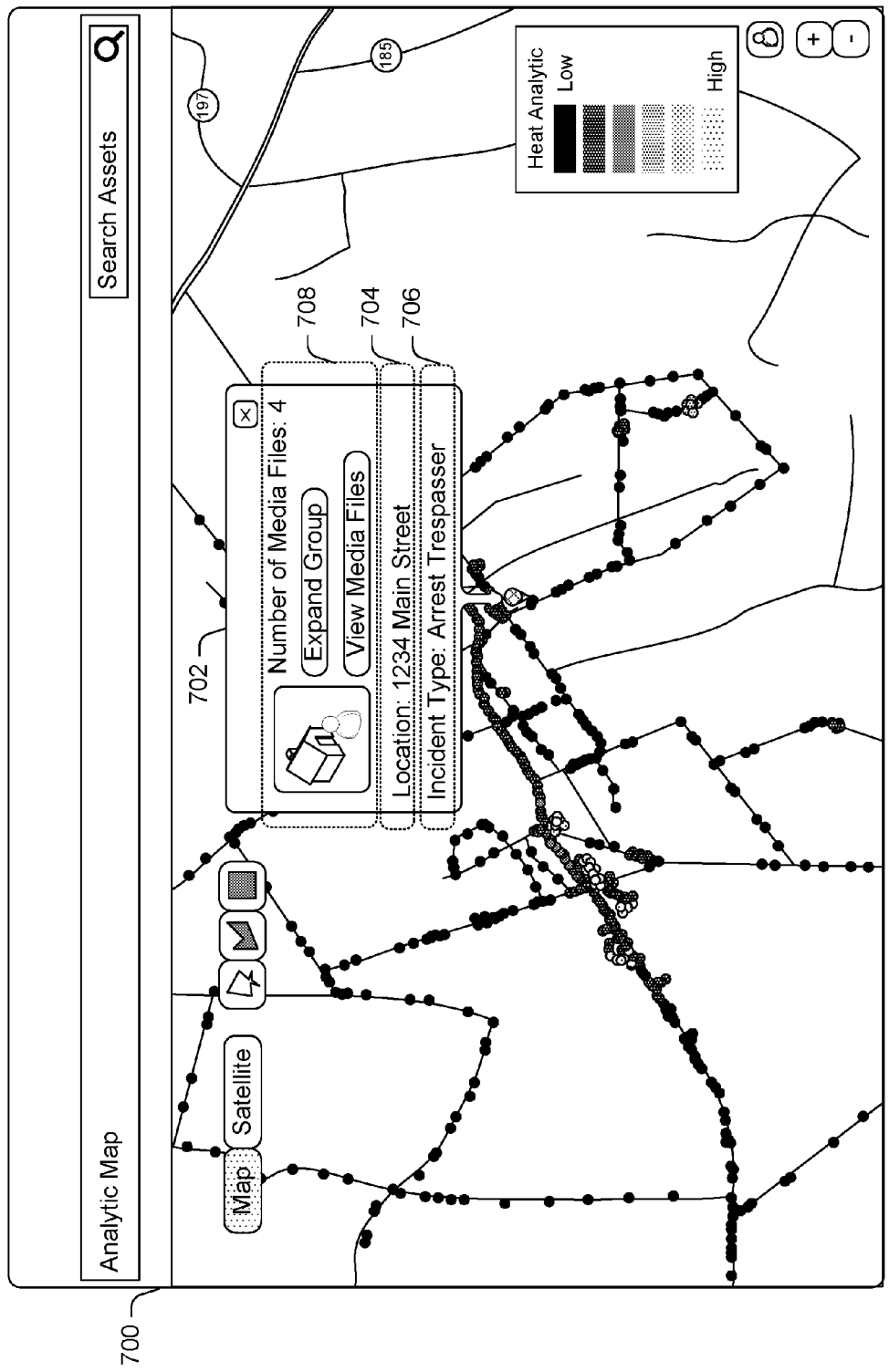
FIG. 7 is an illustrative dashboard interface for displaying incident information that are related to a specific incident that occurred in a geographical area.

FIG. 7 is an illustrative dashboard interface 700 for displaying incident information that are related to a specific incident that occurred in a geographical area. The dashboard interface 700 may display incident markers for incidents that occurred during a particular time interval at a geographical area. The incident markers may be displayed based on map data that is calculated by the analytics engine 112. Upon the selection of a particular incident marker, the dashboard interface 700 may display an incident window 702. The incident window 702 may provide details regarding the selected incident. In various embodiments, the incident window 702 may include address information 704 for the location where the incident occurred, and incident type information 706 that provides details regarding the incident. The incident window 702 may further provide data asset details 708 for the number of data assets that are available for the incident, as well as a thumbnail representation of one or more data assets. The data asset details 708 may further include an expand group control and a view media control. The expand group control may enable a user to view other information that are related to the incidents, such as incident reports, law enforcement officer station assignments, patrol vehicle assignments, arrest records, judicial documents, and/or so forth. The view media control may enable the user to playback the data assets that are associated with the incidents. For example, the data assets may include audio and/or video recordings that capture the interaction of law enforcement officer with the person of the interest that is the subject of the incident.

Figure 8:
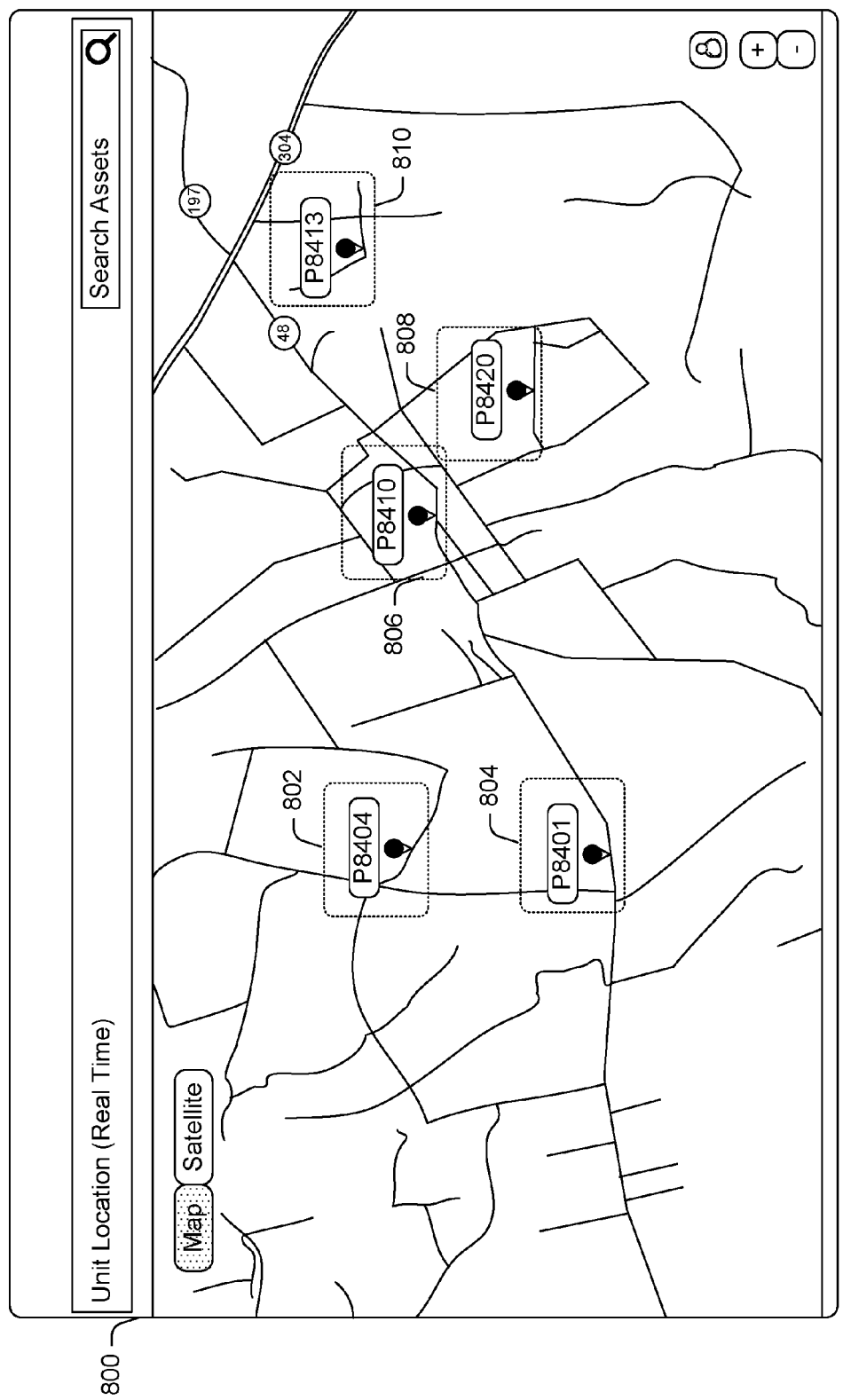
FIG. 8 is an illustrative dashboard interface for displaying a specific set of law enforcement vehicles that are patrolling a particular geographical area.

FIG. 8 is an illustrative dashboard interface 800 for displaying a specific set of law enforcement vehicles that are patrolling a particular geographical area. The dashboard interface 800 may show the real-time locations of law enforcement vehicles, such as the vehicles 802-810. In some embodiments, the dashboard interface 800 may be displayed following the execution of a query in which the user searched for specific law enforcement vehicles to display. For example, the query may specify the display of vehicles operated by law enforcement officers that are assigned to a specific police station. In other examples, the query may specify the display of vehicles that are responding to a specific type of incident, on their way to a particular incident, within a predetermined proximity of a particular incident, and/or so forth. In this way, the user may be provided with a tool for managing the dispatch of law enforcement vehicles.

Example Processes

FIGS. 9-12 present illustrative processes 900-1200 for using analytic maps to show relationships between the locations of incidents and the activities of law enforcement officers. Each of the processes 900-1200 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 900-1200 are described with reference to the architecture 100 of FIG. 1.

Figure 9:
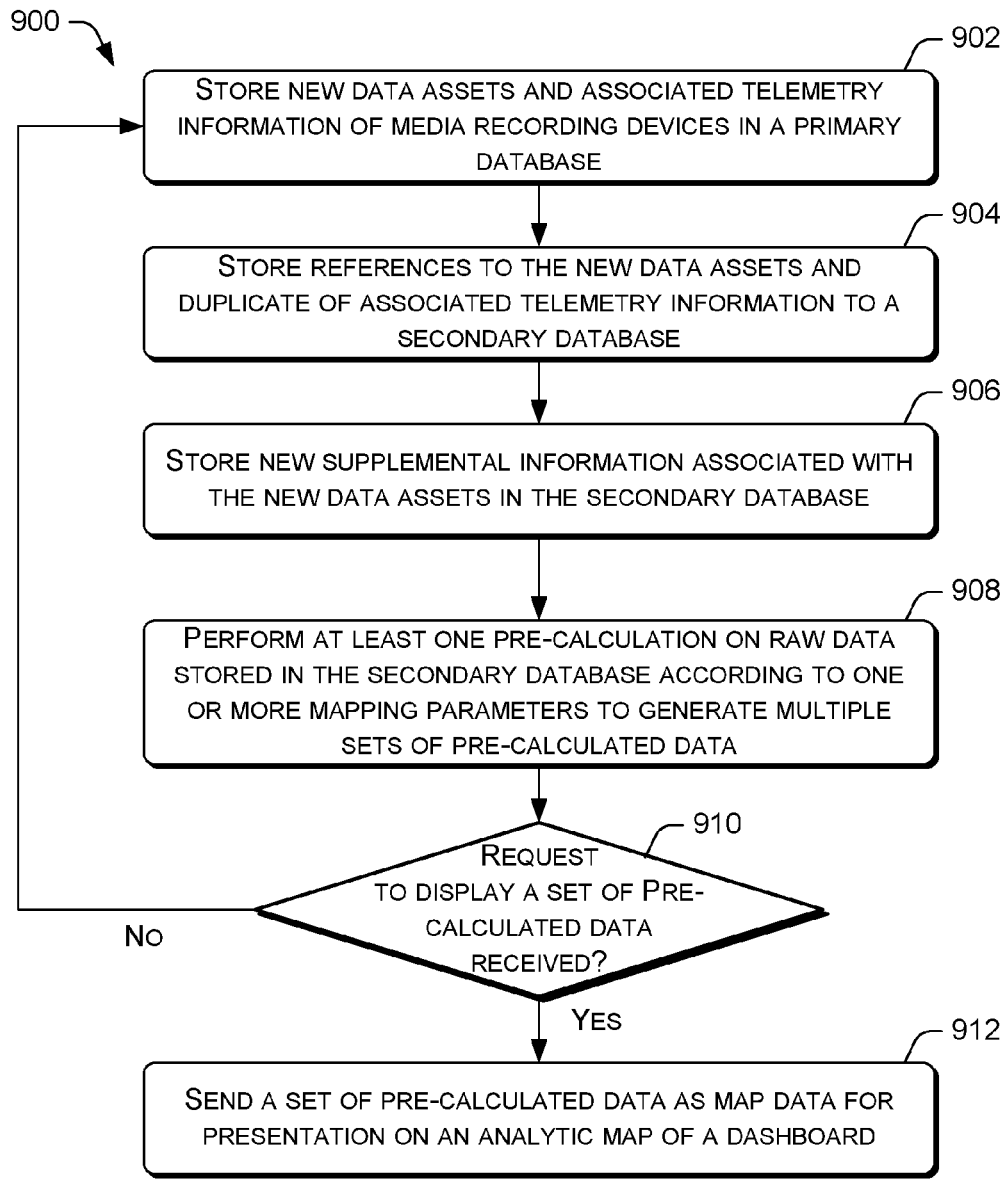
FIG. 9 is a flow diagram of an example process for pre-calculating and displaying incident and law enforcement data on an analytic map of a dashboard.

FIG. 9 is a flow diagram of an example process 900 for pre-calculating and displaying incident and law enforcement data on an analytic map of a dashboard. At block 902, a primary database 114 of the data analysis center 106 may store new data assets and associated telemetry information of media recording devices. The data assets and the telemetry information may be stored in the primary database 114 by the analytic engine 112 of the data analysis center 106. In various embodiments, the analytics engine 112 may obtain the new data assets and the telemetry information by via data push or data pull. In data push, each device may actively send the data assets and the telemetry information on a periodic basis. In data pull, the analytics engine 112 may actively poll each device for the data assets and the telemetry information on a recurring basis.

At block 904, the analytics engine 112 may store the references to the new data assets and duplicate of the associated telemetry information to a secondary database 116 of the data analysis center 106. In various embodiments, the references to the new data assets may be generated by the analytics engine 112, in which the references may enable the retrieval of the data assets from the primary database 114. The telemetry data from the media recording devices may include the identification information of each device, the periodic geolocation readings of each device, as well as the time and date stamp for each geolocation reading.

At block 906, the analytic engine 112 may store new supplemental information that are associated with the new data assets in the secondary database 116. The supplemental information may include incident reports, police investigation reports, law enforcement officer station assignments, patrol vehicle assignments, arrest records, judicial records, and/or other relevant information that are stored in the supplemental databases 118. The supplemental databases 118 may include databases that are maintained by the data analysis center 106 and/or databases that are maintained by third parties. Such third parties may include governmental agencies, private entities, law enforcement agencies, and/or so forth.

At block 908, the analytics engine 112 may perform at least one pre-calculation on the raw data stored in the secondary database 116 according to one or more mapping parameters to generate multiple sets of pre-calculated data. The mapping parameters may specify that the calculations of map data be performed for multiple map zoom levels, for multiple time and/or date intervals, for different types of incidents, for different law enforcement units, and/or so forth. In some embodiments, the sets of map data that are pre-calculated may be tailored based on an individual identity or a group identity of a user that is expected to access the pre-calculated data.

At decision block 910, the analytics engine 112 may determine whether a request to display a set of pre-calculated data is received from a remote computing device (e.g., computing device 124) of a user. The request may be initiated at the remote computing device via a dashboard that is accessed through a web browser or a client application and sent to the analytics engine 112 via the network 108. Accordingly, if the analytics engine 112 determines that such a request is received ("yes" at decision block 910), the process 900 may proceed to block 912. At block 912, the analytics engine 112 may send the set of pre-calculated data as map data for presentation on an analytic map of the dashboard that is generated by the analytics engine 112. However, if the analytics engine 112 determines that no such request is received ("no" at decision block 910), the process 900 may loop back to block 902.

Figure 10:
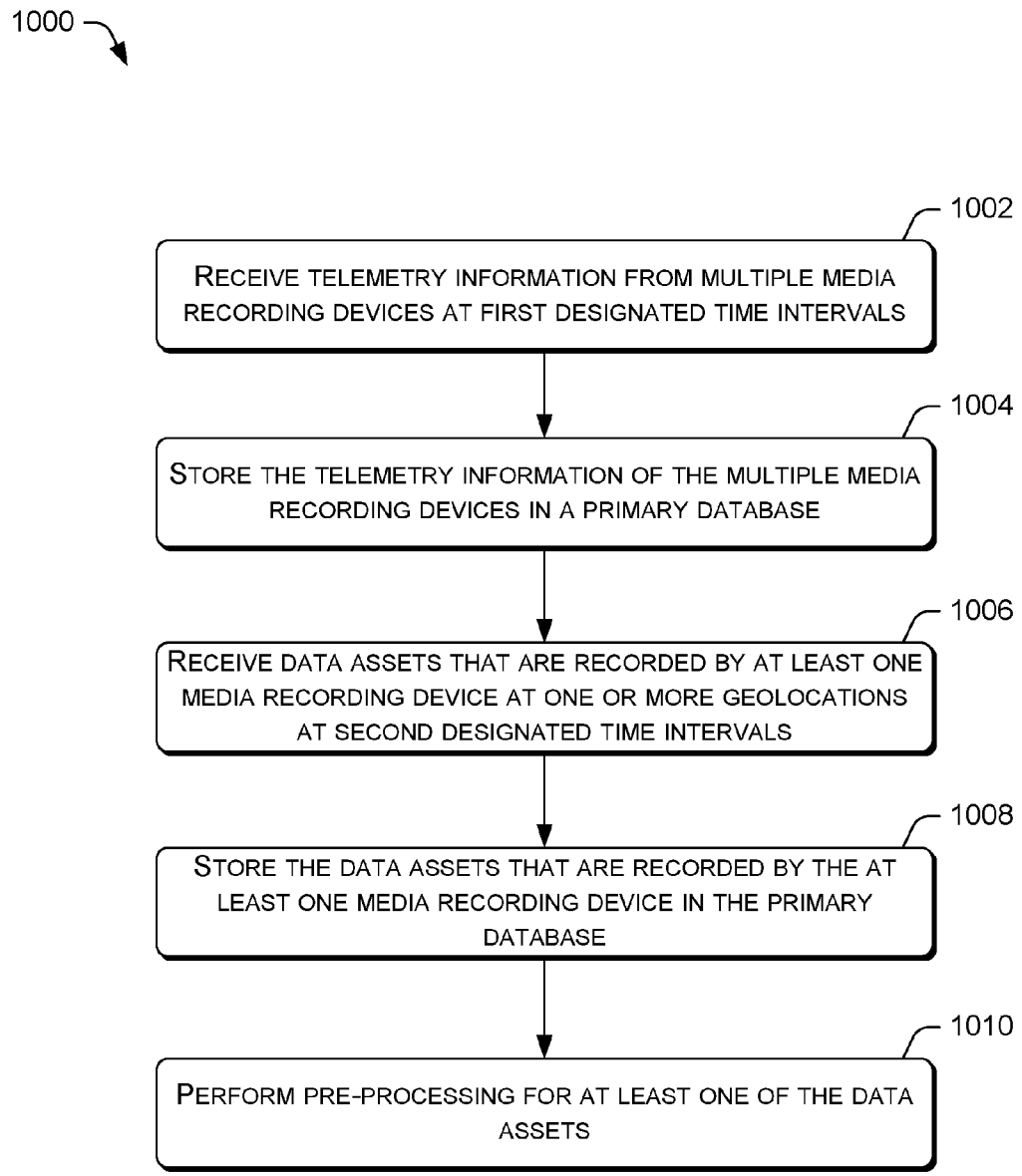
FIG. 10 is a flow diagram of an example process for displaying additional pre-calculated map data and other data on an analytic map of a dashboard.

FIG. 10 is a flow diagram of an example process 1000 for receiving telemetry information and data assets from multiple media recording devices and storing the telemetry information and data assets in a primary database. The process 1000 may further illustrate block 902 of the process 900. At block 1002, the analytic engine 112 may receive telemetry information from multiple media recording devices at first designated time intervals. In some instances, a media recording device may be capable of taking a telemetry reading every 15 seconds. In other embodiments, a media recording device may be reliant upon another device to provide telemetry data to the data analysis center 106. As such, the device may rely upon the other device to provide the telemetry data to the data analysis center 106 via the network 108.

At block 1004, the analytic engine 112 may store the telemetry information of the multiple media recording devices in the primary database 114. In various embodiments, each telemetry reading in the telemetry information for a media recording device may be stored as a separate data entry in the primary database 114.

At block 1006, the analytic engine 112 may receive data assets that are recorded by the multiple media recording devices at second designated time intervals. In various embodiments, each of the second designate time intervals may be longer in duration than the first designated time intervals. For example, the analytics engine 112 may query a media recording device every five minutes for new data assets. At block 1008, the analytic engine 112 may store the data assets that are recorded by the at least one media recording device in the primary database. In various embodiments, the data asset may include metadata that documents the time and date at which the asset was recorded, the duration of the asset, the device identifier of the device that recorded the data asset, the geolocation at which the asset is recorded, and/or so forth. Accordingly, the analytics engine 112 may use the metadata of a data assets to associate the data asset with corresponding device telemetry information.

At block 1010, the analytics engine 112 may perform pre-processing tasks for at least one of the data assets. In various embodiments, the analytics engine 112 may generate a reference for each data asset. The tasks may additionally include the extraction of thumbnail images and text information from a data asset, assembly of received data asset file chunks into a single file, transcoding of the data asset prior to storage into the primary database 114, filtering out certain audio snippets or video images, and/or so forth.

Figure 11:
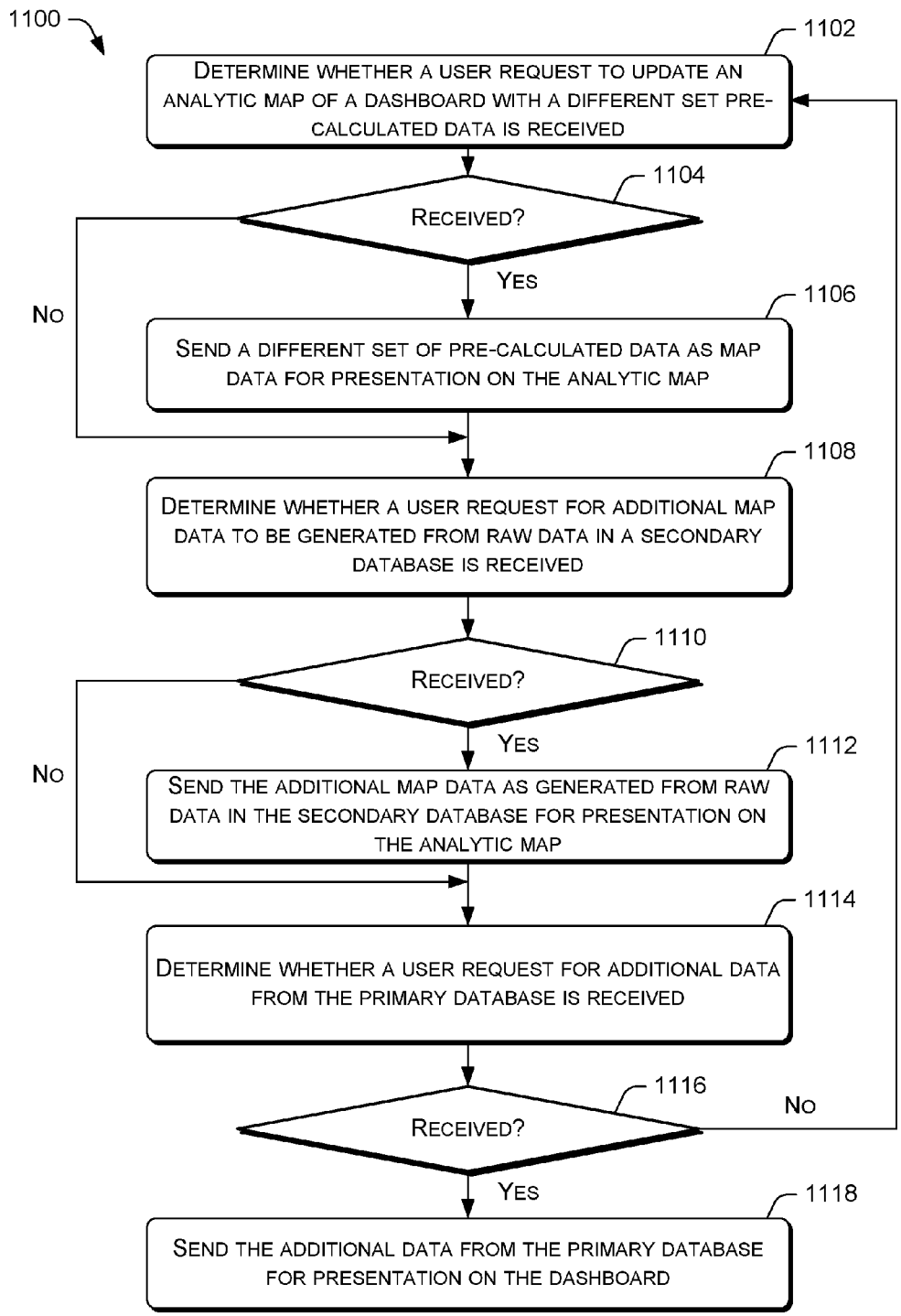
FIG. 11 is a flow diagram of an example process for receiving telemetry information and data assets from multiple media recording devices and storing the telemetry information and data assets in a primary database.

FIG. 11 is a flow diagram of an example process 1100 for displaying additional pre-calculated map data and other data on an analytic map of a dashboard. At block 1102, the analytics engine 112 may determine whether a user request to update an analytic map of a dashboard with a different set of pre-calculated data is received. For example, a different set of pre-calculated data may be requested by the user for viewing the analytic map at a different zoom level, for different incidents, with respect to different law enforcement units, and/or so forth. Thus, at decision block 1104, if the analytics engine 112 determines that a user request for a different set of pre-calculated data is received ("yes" at decision block 1104), the process may proceed to block 1106. At block 1106, the analytics engine 112 may send a different set of pre-calculated data as map data for presentation on the analytic map.

At block 1108, the analytics engine 112 may determine whether a user request for additional map data to be generated from raw data in the secondary database 116 is received. In various embodiments, the user request may be initiate via interactive interfaces that are present on an analytic map previously displayed to the user. The additional map data may enable the user to view additional information for one or more incidents, one or more law enforcement units, and/or so forth. Thus, at decision block 1110, if the analytics engine 112 determines that a request for additional map data is received ("yes" at decision block 1110), the process 1100 may proceed to block 1112. At block 1112, the analytics engine 112 may send additional map data as generated from raw data in the secondary database for presentation on the analytic map.

At block 1114, the analytics engine 112 may determine whether a user request for additional data from the primary database 114 is received. In various embodiments, the user request may be initiate via interactive interfaces that are present on an analytic map previously displayed to the user. For example, the user may request to view or playback a particular data asset associated with an incident that is displayed on an analytic map. Thus, at decision block 1116, if the analytics engine 112 determines that a request for additional data from the primary database 114 is received ("yes" at decision block 1116), the process 1100 may proceed to block 1118. At block 1118, the analytics engine 112 may send the additional data from the primary database 114 for presentation on the dashboard. In the example above, the user request may trigger the analytics engine 112 to retrieve the data asset associated with an incident from the primary database via a reference to the data asset. Subsequently, the analytic engine 112 may provide the user with access to the data asset via the dashboard. However, if the analytics engine 112 determines that a request for additional data from the primary database 114 is not received ("no" at decision block 1116), the process 1100 may loop back to block 1102.

Returning to decision block 1104, if the analytics engine 112 determines that a user request for a different set of pre-calculated data is not received ("no" at decision block 1104), the process 1100 may proceed directly to block 1108. Returning to decision block 1110, if the analytics engine 112 determines that a request for additional map data is not received ("no" at decision block 1110), the process 1100 may proceed directly to block 1114.

Figure 12:
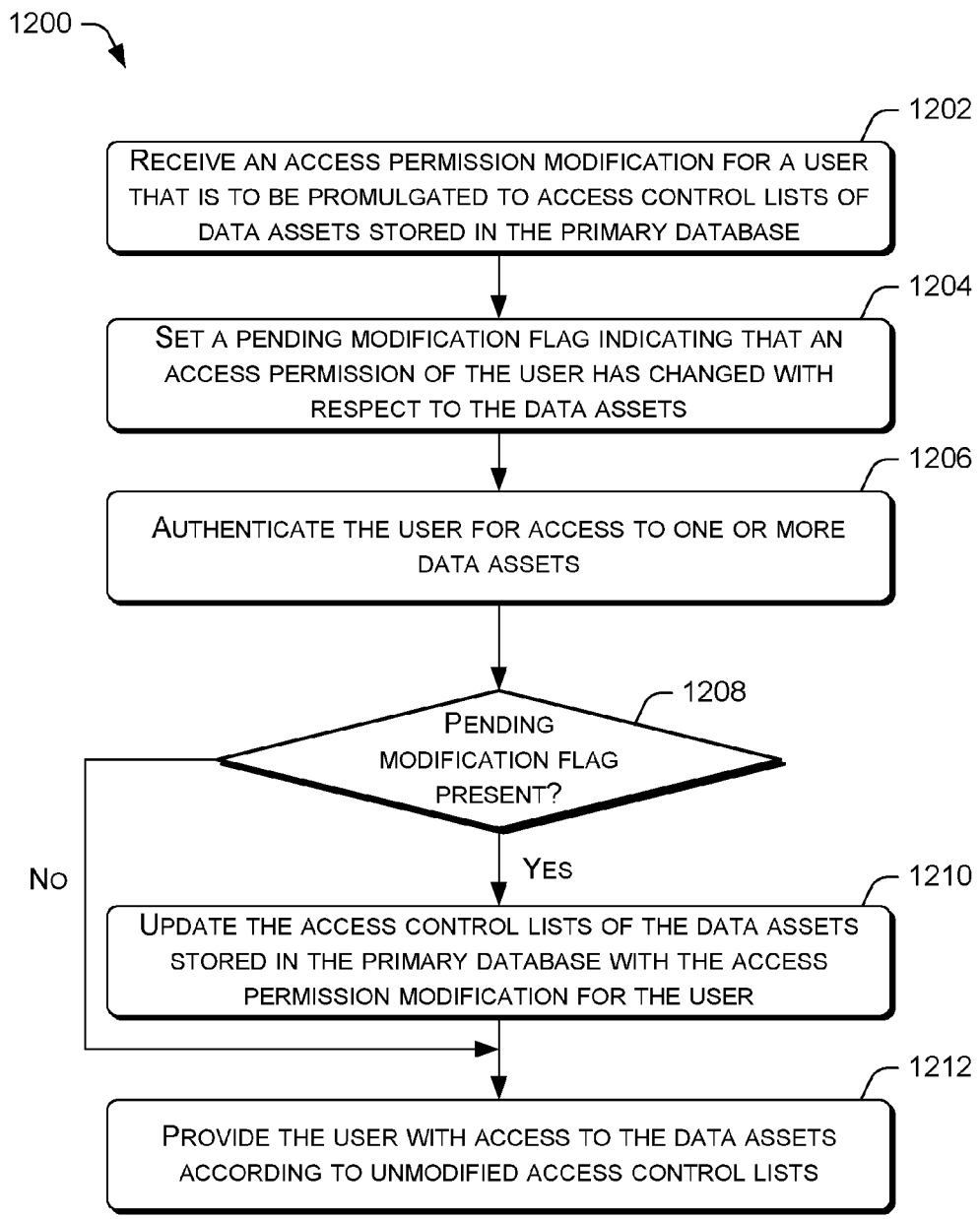
FIG. 12 is a flow diagram of an example process for control using access to data assets that are stored in a primary database.

FIG. 12 is a flow diagram of an example process 1200 for control using access to data assets that are stored in a primary database. At block 1202, the analytics engine 112 may receive an access permission modification for a user that is to be promulgated to access control lists of data assets stored in the primary database 114. In various embodiments, the access privilege modification to an access control list of a data asset may grant the user access to the data asset, revoke the access of the user to the data asset, grant conditional access to the data asset, and/or so forth. The access permission modification may be caused by a group affiliation of the user, a relationship of the user to another user, a relationship of the user to a specific incident or case, and/or so forth.

At block 1204, the analytics engine 112 may set a pending modification flag indicating that the access permission of the user has changed with respect to the data assets. In various embodiments, the pending modification flag and the access permission modification that is to be promulgated to the access control lists of the data assets may be stored in a temporary data buffer of the analytics engine 112.

At block 1206, the analytics engine 112 may authenticate the user for access to one or more data assets. In various embodiments, the user may be authenticated when authentication credentials submitted by the user via a remote computing device matches authentication credentials that are registered in the analytics engine 112.

At decision block 1208, the analytics engine 112 may determine whether a pending modification flag is present in the temporary data buffer following the successful authentication of the user. Accordingly, if the pending modification flag is present ("yes" at decision block 1208), the process 1200 may proceed to block 1210. At block 1210, the analytics engine 112 may update the access control lists of the data assets stored in the primary database 114 with the access permission modification for the user. In various embodiments, the access privilege modification to an access control list of a data asset may grant the user access to the data asset, revoke the access of the user to the data asset, grant conditional access to the data asset, and/or so forth. At block 1212, the analytics engine 112 may provide the user with access to the data assets according to corresponding unmodified access control lists. However, if the pending modification flag is not present ("no" at decision block 1208), the process 1200 may proceed to directly to block 1212.

The correlations between law enforcement activity and incidents as depicted analytic maps may be used by law enforcement agencies to develop strategies for responding to crime. By view analytic maps of different time periods, a law enforcement agency is able to visually ascertain the impact of law enforcement activities in different geographical areas over time. Thus, the law enforcement agency may adapt to changes and shifts in criminal activities as crime migrate to new areas due to socioeconomic or demographic changes. In this way, the law enforcement agency is able to reallocate law enforcement officers to different locations to maximize the use of policing resources while minimizing ineffective or wasteful policing practices.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   storing one or more data assets and associated telemetry information of at least one media recording device in a primary database, the one or more data assets including an audio recording, a video recording, or a multimedia recording, the associated telemetry information including geolocations of the at least one media recording device at multiple times;
   storing at least one reference to the one or more data assets and duplicate of the associated telemetry information in a secondary database, the secondary database providing faster data read speed than the primary database;
   performing pre-calculations based at least on the telemetry information as stored in the secondary database according to one or more mapping parameters to generate multiple sets of pre-calculated data; and
   sending a set of pre-calculated data from the multiple sets of pre-calculated data for presentation on an analytic map of a dashboard displayed on a remote computing device.

2. The one or more computer-readable media of claim 1, wherein the primary database is a relational or transactional database, and the secondary database is a nonrelational or non-transactional database.

3. The one or more computer-readable media of claim 1, wherein the acts comprise storing supplemental information that is associated with the telemetry information in the primary database, the supplemental information including incident reports for one or more incidents occurring in a geographical region, and wherein performing the pre-calculation includes performing the pre-calculation based on the incident reports to generate a set of pre-calculated mapping data that shows a distribution of incidents in the geographical region.

4. The one or more computer-readable media of claim 3, wherein the pre-calculated mapping data provides for the distribution of the incidents to be shown using different incident markers that show saturation degrees of different incidents in the geographical region.

5. The one or more computer-readable media of claim 3, wherein performing the pre-calculation includes performing the pre-calculation based on the telemetry information and the incident reports to generate a set of calculated mapping data that associate multiple law enforcement officers with a plurality of incidents.

6. The one or more computer-readable media of claim 5, wherein the at least one media recording device is used by one or more law enforcement officers, and wherein the acts further comprise:
   receiving a user request for a data asset as stored in the primary database via an interactive interface provided by the analytic map or via a query for a text that is associated with the data asset, the data asset captured by a media recording device of the law enforcement officer and recording the incident;
   retrieving the data asset as stored in the primary database using a reference to the data asset as stored in the secondary database; and sending the data asset to the remote computing device for presentation on the dashboard displayed on the remote computing device.

7. The one or more computer-readable media of claim 6, wherein the data asset is a pre-processed data asset that includes a redacted video image or a redacted audio snippet, the pre-processed data asset being stored in the primary database with an original version of the data asset.

8. The one or more computer-readable media of claim 5, wherein the acts further comprise:
  receiving a user selection of one or more incidents via a geo-fencing interface provided by the analytic map; and
  sending additional map data that includes identities of one or more law enforcement officers that are associated with the one or more incidents to the remote computing device for presentation on the dashboard displayed on the remote computing device.

9. The one or more computer-readable media of claim 8, wherein the additional map data includes at least one of statistical data on an amount of time a law enforcement officer spent on an incident or a link to a data asset that captures the incident.

10. The one or more computer-readable media of claim 5, wherein the supplemental information further associates a plurality of law enforcement officers with at least one of police stations and patrol vehicles, and classifies multiple incidents according to incident type, and wherein the acts further comprise:
  receiving a user query for incidents that are associated with a police station, a patrol vehicle, or an incident type via an interactive interface provided by the analytic map; and
  sending data that identifies one or more incidents that are associated with the police station, the patrol vehicle, or the incident type to the remote computing device for presentation on the dashboard displayed on the remote computing device.

11. The one or more computer-readable media of claim 1, wherein the at least one media recording device is used by one or more law enforcement officers, and wherein performing the pre-calculation includes performing the pre-calculation based on the telemetry information to generate a set of pre-calculated mapping data that shows geolocations of the one or more law enforcement officers.

12. The one or more computer-readable media of claim 1, wherein the acts further comprise:
  receiving a user request to update the analytic map of the dashboard with an additional set of pre-calculated data of the multiple sets of pre-calculated data, the additional set providing a different zoom level or incident type than the set of pre-calculated data; and
  sending the additional set of pre-calculated data for presentation on the analytic map of the dashboard displayed on the remote computing device.

13. The one or more computer-readable media of claim 1, wherein the storing the associated telemetry information includes storing telemetry data that is received from a media recording device at a first set of time intervals, and wherein the acts further comprising filtering out geolocation data from the telemetry data such that the geolocations of the media recording device are displayed according to a second set of time intervals that are longer than the first set of time intervals.

14. The one or more computer-readable media of claim 1, wherein the acts further comprise:
  receiving an access permission modification for a user that is to be promulgated to access control lists of a plurality of data assets stored in the primary database;
  setting a pending modification flag indicating that an access permission of the user has changed with respect to the plurality of data assets stored in the primary database; and
  updating the access control lists of the data assets stored in the primary database in response to detecting the pending modification flag following an authentication of the user for access to the dashboard.

15. A system, comprising:
one or more processors; and
memory having instructions stored therein, the instructions, when executed by the one or more processors, cause the one or more processors to perform acts comprising:
  storing one or more data assets and associated telemetry information of at least one media recording device in a primary database, the one or more data assets including an audio recording, a video recording, or a multimedia recording, the associated telemetry information including geolocations of the at least one media recording device at multiple times;
  storing at least one reference to the one or more data assets and duplicate of the associated telemetry information in a secondary database, the secondary database providing faster data read speed than the primary database;
  performing pre-calculations based at least on the telemetry information as stored in the secondary database according to one or more mapping parameters to generate multiple sets of pre-calculated data, the multiple sets of pre-calculated data include one or more sets of pre-calculated data for providing the geolocations of the media recording devices; and
  sending a set of pre-calculated data from the multiple sets of pre-calculated data for presentation on an analytic map of a dashboard displayed on a remote computing device, the analytic map providing an interactive interface for triggering a retrieval of a data asset from the primary database via a corresponding reference.

16. The system of claim 15, wherein the acts further comprise:
  storing supplemental information that is associated with the telemetry information in the secondary database, the supplemental information including incident reports for one or more incidents occurring in a geographical region; and
  performing an additional pre-calculation based on the incident reports to generate a set of pre-calculated mapping data that shows a distribution of incidents in the geographical region.

17. The system of claim 15, wherein the acts comprise:
receiving a user request to update the analytic map of the dashboard with an additional set of pre-calculated data of the multiple sets of pre-calculated data, the additional set providing a different zoom level or incident type than the set of pre-calculated data; and
  sending the additional set of pre-calculated data for presentation on the analytic map of the dashboard displayed on the remote computing device.

18. The system of claim 16, wherein the acts further comprise performing an additional pre-calculation based on the telemetry information and the incident reports to generate a set of calculated mapping data that associates multiple law enforcement officers with a plurality of incidents.

19. The system of claim 16, wherein the acts further comprise providing at least one of the one or more data assets, the telemetry information, or the pre-calculated to a third party via an application program interface (API) or a database adapter of a database.

20. The system of claim 16, wherein the acts comprise:
receiving a user request to generate additional map data based on the telemetry information and the supplemental information for presentation on the analytic map of the dashboard displayed on the remote computing device; and
sending the additional map data as generated from the telemetry information and the supplemental information for presentation on the analytic map of the dashboard displayed on the remote computing device.

21. A computer-implemented method, comprising:
storing, via one or more computing devices, one or more data assets and associated telemetry information of at least one media recording device in a primary database, the one or more data assets including an audio recording, a video recording, or a multimedia recording, the associated telemetry information including geolocations of the at least one media recording device at multiple times;
storing, via the one or more computing devices, at least one reference to the one or more data assets and duplicate of the associated telemetry information in a secondary database, the secondary database providing faster data read speed than the primary database;
storing, via the one or more computing devices, supplemental information that is associated with the telemetry information in the secondary database, the supplemental information including incident reports for one or more incidents occurring in a geographical region;
performing, via one or more computing devices, pre-calculations based on at least one of the telemetry information or the incident reports as stored in the secondary database according to one or more mapping parameters to generate multiple sets of pre-calculated data;
sending, via one or more computing devices, a set of pre-calculated data from the multiple sets of pre-calculated data for presentation on an analytic map of a dashboard displayed on a remote computing device;
receiving, via the one or more computing devices, a user request to update the analytic map of the dashboard with an additional set of pre-calculated data of the multiple sets of pre-calculated data, the additional set providing a different zoom level or incident type than the set of pre-calculated data; and
sending, via the one or more computing devices, the additional set of pre-calculated data for presentation on the analytic map of the dashboard displayed on the remote computing device.

* * * * *